(12) United States Patent
Kimura

(10) Patent No.: US 12,169,372 B2
(45) Date of Patent: Dec. 17, 2024

(54) LIGHT SCANNING APPARATUS AND IMAGE FORMING APPARATUS INCLUDING THE SAME

(71) Applicant: CANON KABUSHIKI KAISHA, Tokyo (JP)

(72) Inventor: Kazumi Kimura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 724 days.

(21) Appl. No.: 17/481,824

(22) Filed: Sep. 22, 2021

(65) Prior Publication Data

US 2022/0100118 A1  Mar. 31, 2022

(30) Foreign Application Priority Data

Sep. 29, 2020 (JP) .................. 2020-163480

(51) Int. Cl.
 *G02B 26/12* (2006.01)
 *G03G 15/043* (2006.01)

(52) U.S. Cl.
 CPC ......... *G03G 15/043* (2013.01); *G02B 26/125* (2013.01)

(58) Field of Classification Search
 USPC .......................................... 359/205.1–207.7
 See application file for complete search history.

(56) References Cited

U.S. PATENT DOCUMENTS

| 4,686,363 A * | 8/1987 | Schoon ................. H04N 1/053 |
| | | 358/480 |
| 8,223,416 B2 * | 7/2012 | Yukawa ............... G02B 26/125 |
| | | 359/205.1 |
| 8,520,281 B2 * | 8/2013 | Fujino ................ G02B 13/0005 |
| | | 359/207.3 |

FOREIGN PATENT DOCUMENTS

| JP | H11202242 A | 7/1999 |
| JP | 2000098288 A | 4/2000 |
| JP | 2001296491 A | 10/2001 |
| JP | 2005024958 A | 1/2005 |
| JP | 2013015611 A | 1/2013 |
| JP | 2017165023 A | 9/2017 |
| JP | 2017209965 A | 11/2017 |
| JP | 2018097086 A | 6/2018 |

* cited by examiner

*Primary Examiner* — Jennifer D. Carruth
(74) *Attorney, Agent, or Firm* — Canon U.S.A., Inc. IP Division

(57) ABSTRACT

An apparatus includes a deflecting unit deflecting a light flux from a light source to scan a scanned surface in a main scanning direction, and an imaging optical system guiding the deflected light flux the scanned surface. A width of the light flux is larger than that of a deflecting surface of the deflecting unit in a main scanning cross section when it is incident on deflecting surface. A refractive power in main scanning cross section of the imaging optical system is different between a first position through which an on-axis light flux passes and a second position through which an outermost off-axis light flux passes. A first region at one side is longer than a second region at the other side with respect to an optical axis of the imaging optical system on the scanned surface.

20 Claims, 9 Drawing Sheets

PRIOR ART

LIGHT SCANNING APPARATUS AND IMAGE FORMING APPARATUS INCLUDING THE SAME

BACKGROUND

Field of the Disclosure

The aspect of the embodiments relates to a light scanning apparatus, particularly is suitable for an image forming apparatus such as a laser beam printer or a multifunction printer by using an electrophotographic process.

Description of the Related Art

Conventionally, in order to achieve printing with a high definition at a high speed, a so-called overfilled scan (OFS) type light scanning apparatus, which includes a deflecting unit formed by a deflecting surface having a width smaller than that in a main scanning direction of an incident light flux, is used.

In such light scanning apparatus, the width and an energy of the reflected and deflected light flux change according to an angle of the deflecting surface by moving the deflecting surface with changing the angle in the incident light flux, so that a spot diameter changes and an illuminance also changes according to an image height on a scanned surface.

Japanese Patent Application Laid-Open No. H11-202242 discloses an light scanning apparatus in which such variations in the spot diameter and the illuminance according to the image height are suppressed by providing an optical element with both of a phase shift function and a diffraction function and having a characteristic in which both of a phase shift amount and a diffraction efficiency are asymmetric with respect to an optical axis in an incident optical system.

FIG. 9 shows a main scanning cross-sectional view of a light scanning apparatus 500 disclosed in Japanese Patent Application Laid-Open No. H11-202242.

As shown in FIG. 9, the light scanning apparatus 500 disclosed in Japanese Patent Application Laid-Open No. H11-202242 includes a light source 10, an incident optical system formed by a coupling lens or the like, a polygon mirror (rotating polygon mirror) 16 serving as a deflecting unit and an imaging optical system (Fθ lens) 18.

The polygon mirror 16 provided in the light scanning apparatus 500 is a polyhedron having twelve deflecting surfaces.

An incident light flux I emitted from the light source 10 is guided toward the polygon mirror 16 by the incident optical system formed by an optical element 30 or the like.

The incident light flux I has a width wider than that of the deflecting surface of the polygon mirror 16 in the main scanning direction.

By rotating the polygon mirror 16, a predetermined deflecting surface moves in the incident light flux I so as to cut the incident light flux I, thereby the incident light flux I is deflected to the imaging optical system 18.

Thereafter, the deflected light flux scans a printed area on the photosensitive drum 20 corresponding to a scanned surface with forming a beam spot by an imaging performance of the imaging optical system 18, thereby printing is performed.

A system of perfoming a scan by the incident light flux having a width wider than that of the deflecting surface in the main scanning direction is called an OFS system as the light scanning apparatus 500.

On the other hand, a system of perfoming the scan by the incident light flux having the width sufficiently narrower than that of the deflecting surface in the main scanning direction is called an underfilled scan (UFS) system.

In the light scanning apparatus using the OFS system, it is possible to achieve printing with a high definition at a high speed without increasing a size of the light scanning apparatus since a size of the polygon mirror can be easily reduced even when the number of the deflecting surfaces is increased in the polygon mirror as compared with that using the UFS system.

On the other hand, the width and an energy of the deflected light flux change according to the angle of the deflecting surface since the deflecting surface moves with changing the angle in the incident light flux I in the light scanning apparatus using the OFS system.

Thereby, a spot diameter changes and an illuminance also changes according to the image height on the scanned surface.

By changing the spot diameter and the illuminance at each image height on the scanned surface, there arises an issue that a uniform printed image cannot be obtained when the light scanning apparatus is used in an image forming apparatus.

On the other hand, in the light scanning apparatus 500 disclosed in Japanese Patent Application Laid-Open No. H11-202242, the optical element 30 with both of a phase shift function and a diffraction function and having a characteristic in which both of a phase shift amount and a diffraction efficiency are asymmetric with respect to an optical axis is provided in the incident optical system, thereby the above-described issue is solved.

However, the light scanning apparatus 500 using the OFS system disclosed in Japanese Patent Application Laid-Open No. H11-202242 has the following issues.

First, it becomes difficult to reduce a size and a cost of the apparatus since it is necessary to add the optical element 30 in a complicated shape having both of a phase shift surface and a diffraction grating surface.

Further, it is difficult to manufacture the optical element 30 at a low cost since a degree of difficulty in manufacturing such optical element 30 which achieves a predetermined phase shift amount is increased.

Specifically, a surface shape in which the phase changes by $2\pi$ asymmetrically across the optical axis in an effective portion of the optical element 30 is required.

It is difficult to manufacture the optical element 30 having such a complicated and strict optical surface shape with a high accuracy by injection molding using a mold, and it is difficult to reduce the cost even in the case of manufacturing by cutting and polishing.

Furthermore, there is also a significant disadvantage caused by providing the optical element 30 having a plurality of regions with a diffraction efficiency different from each other.

Specifically, it is difficult to manufacture the optical element 30 provided with two regions in which the diffraction efficiency of 0th-order light is 100% and 75%, respectively.

Further, as described in the paragraph [0053] of Japanese Patent Application Laid-Open No. H11-202242, an intensity distribution of the incident light flux I which is incident on the optical element 30 has a Gaussian distribution according to a far field pattern (FFP) of a laser used for the light source 10.

Here, it is known that the FFP of the laser has a tolerance, and generally has a large variation width between 9° and 16°, and between 23° and 36°.

Therefore, in the optical element 30, an energy density in the light flux over the region where the diffraction efficiency is 100% and the region where the diffraction efficiency is 75% varies according to the laser, and it is difficult to perform a strict energy control in the incident light flux I.

Further, when the energy density varies in the incident light flux I, the shape of the spot on the scanned surface, namely the photosensitive drum 20, also collapses.

In addition, if higher-order diffracted light in the region where the diffraction efficiency of the 0th-order light is 75% is ignored in the optical element 30, ±1st-order diffracted light has an energy of 25% and reaches the photosensitive drum 20 as a flare or a ghost, so that a printing performance deteriorates.

In order to suppress such deterioration of the printing performance, it is necessary to provide a light shielding wall for properly shielding such flare and ghost.

SUMMARY OF THE DISCLOSURE

Accordingly, it is an object of the aspect of the embodiments to provide a compact light scanning apparatus that can suppress variations in the spot diameter and the illuminance associated with the OFS system.

The light scanning apparatus according to the aspect of the embodiments includes a deflecting unit configured to deflect a light flux from a light source to scan a scanned surface in a main scanning direction, and an imaging optical system configured to guide the light flux deflected by the deflecting unit to the scanned surface. A width of the light flux is larger than the width of a deflecting surface of the deflecting unit in a main scanning cross section when the light flux is incident on the deflecting surface. A refractive power in the main scanning cross section of the imaging optical system is different between a first position through which an on-axis light flux passes and a second position through which an outermost off-axis light flux passes. A first region at one side is longer than a second region at the other side with respect to an optical axis of the imaging optical system on the scanned surface.

Further features of the disclosure will become apparent from the following description of exemplary embodiments with reference to the attached drawings.

DESCRIPTION OF THE EMBODIMENTS

The light scanning apparatus according to the disclosure is described in detail below with reference to the accompanying drawings. In order to facilitate understanding of the disclosure, the following drawings may be drawn in a scale different from the actual scale.

In the following description, an axis parallel to the optical axis of the imaging optical system 85 is defined as an X-axis, an axis parallel to the main scanning direction is defined as a Y-axis, and an axis parallel to the sub-scanning direction is defined as a Z-axis.

First Embodiment

Conventionally, a light scanning apparatus is used as an exposing apparatus for an image forming apparatus such as a laser beam printer by using an electrophotographic process.

In the light scanning apparatus, a light flux emitted from a light source after being modulated in accordance with an image signal from a personal computer side is guided to a deflecting unit such as a polygon mirror (rotating polygon mirror) by an incident optical system, and then deflected by a deflecting surface of the deflecting unit.

The deflected light flux is condensed in a spot shape on a photosensitive drum serving as a scanned surface by an imaging optical system having a FΘ characteristic, and the formed spot scans the scanned surface by rotating the deflecting unit to perform exposure recording of image information.

Further, there are also proposed various color image forming apparatuses for forming a color image by scanning a plurality of photosensitive drums with using a plurality of light scanning apparatuses.

In recent years, an overfilled scan (OFS) system is proposed for increasing the number of deflecting surfaces in a polygon mirror in order to achieve printing with a high definition at a high speed.

It is an object of the aspect of the embodiments to provide an light scanning apparatus capable of reducing a variation of spot diameter and a non-uniformity of image surface illuminance which occur when using the OFS system for achieving a high speed and a high definition without increasing the number of components.

Figure 1:
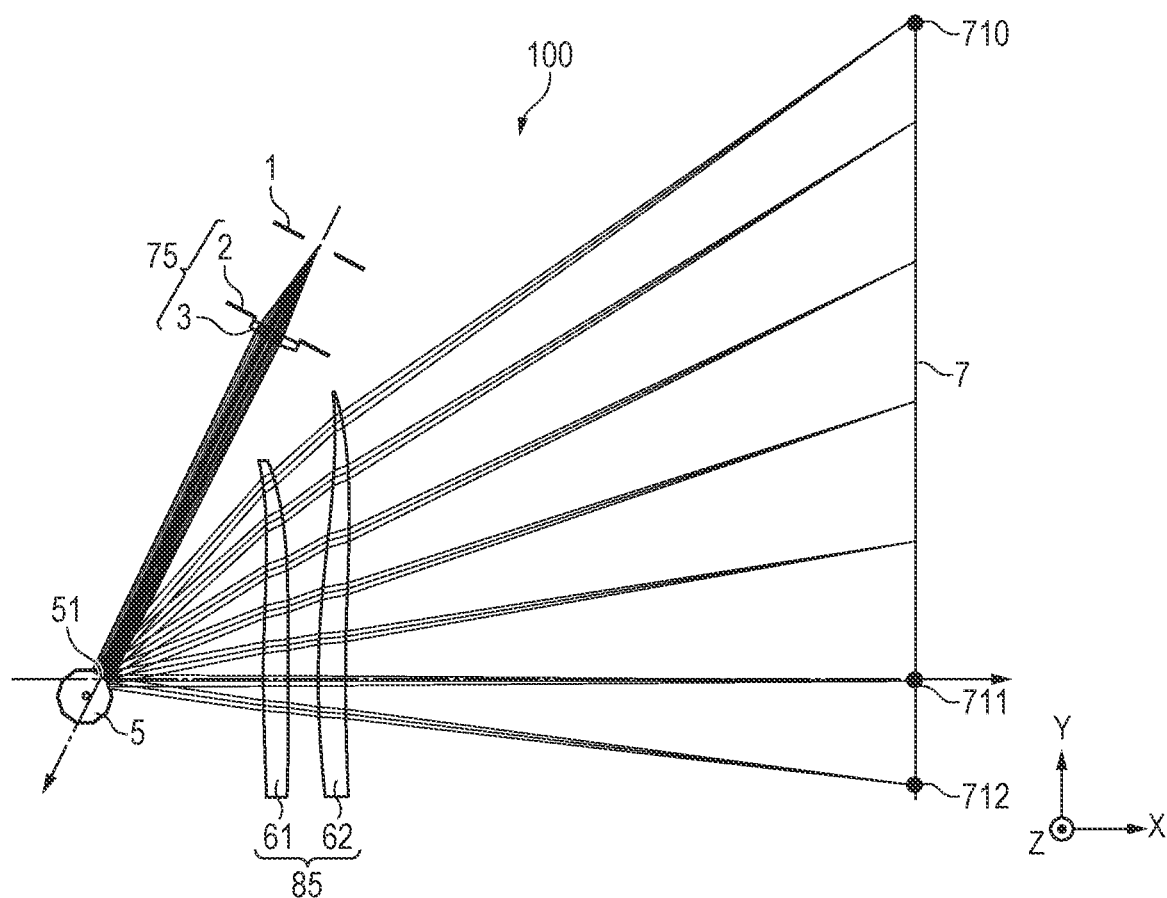
FIG. 1 is a main scanning cross-sectional view of the light scanning apparatus according to a first embodiment of the disclosure.

FIG. 1 shows a main scanning cross-sectional view of an light scanning apparatus 100 according to a first embodiment of the disclosure.

Figure 2:
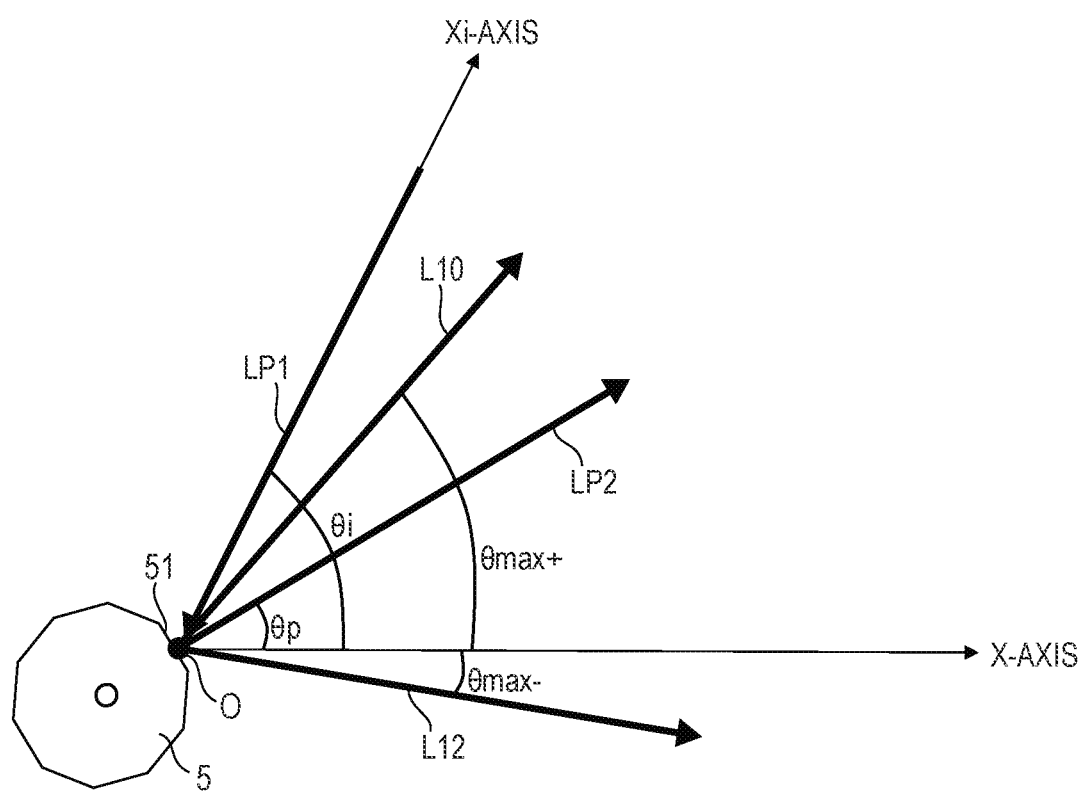
FIG. 2 is a diagram illustrating definitions of each angle in the light scanning apparatus according to the first embodiment.

Further, FIG. 2 shows a diagram for explaining a definition of each angle in the light scanning apparatus 100 according to the first embodiment.

The light scanning apparatus 100 of the present embodiment includes a light source 1, a stop 2, a coupling lens 3, a deflecting unit 5, a first imaging lens 61 and a second imaging lens 62.

The stop 2 regulates respective widths in the main scanning direction and the sub-scanning direction of the light flux emitted from the light source 1.

The width in the main scanning direction of the stop 2 is set to be sufficiently wide so that the width in the main scanning direction of the light flux which is incident on the deflecting unit 5 is wider than that in the main scanning cross section of the deflecting surface 51 of the deflecting unit 5.

The coupling lens 3 is an anamorphic lens having different powers between the sub-scanning cross section and the main scanning cross section.

The light flux having passed through the stop 2 is converted into a parallel light flux in the main scanning cross section by the coupling lens 3, and condensed in the sub-scanning cross section.

Here, the parallel light flux includes not only a strictly parallel light flux but also a substantially parallel light flux such as a weakly divergent light flux and a weakly convergent light flux.

The deflecting unit 5 is a ten-surface type polygon mirror and is driven for rotating at a predetermined and constant angular velocity by a non-illustrated driving motor to deflect the incident light flux for scanning.

In the light scanning apparatus 100 according to the present embodiment, the light flux having a width in the main scanning direction wider than that in the main scanning cross section of the deflecting surface 51 is incident on the deflecting unit 5 as described above.

In other words, the width of the light flux when it is incident on the deflecting surface 51 of the deflecting unit 5 is larger than that of the deflecting surface 51 of the deflecting unit 5 in the main scanning cross section.

Therefore, the width in the main scanning direction of the light flux deflected by the deflecting unit 5 is determined by the width in the main scanning cross section of the deflecting surface 51. This system is called the overfilled scan (OFS) system.

The first imaging lens 61 and the second imaging lens 62 guide (condense) the light flux deflected by the deflecting unit 5 onto the scanned surface 7.

From the above-described structure of the light scanning apparatus 100 according to the present embodiment, the light flux emitted from the light source 1 passes through the stop 2 and the coupling lens 3 to be converted into a parallel light flux (or a weakly convergent light flux) in the main scanning cross section and condensed to form a line image (focal line) on the deflecting surface 51 of the deflecting unit 5 in the sub-scanning cross section.

The light flux deflected by the deflecting unit 5 passes through the first imaging lens 61 and the second imaging lens 62 and is condensed on the scanned surface 7. The scanned surface 7 is scanned by rotating the deflecting unit 5 at a constant speed.

An incident optical system 75 (first optical system) is formed by the stop 2 and the coupling lens 3, and an imaging optical system 85 (second optical system) is formed by the first imaging lens 61 and the second imaging lens 62 in the light scanning apparatus 100 according to the present embodiment.

Although an anamorphic lens is used as the coupling lens 3 in the light scanning apparatus 100 according to the present embodiment, a rotationally symmetric coupling lens and a cylinder lens having a power in the sub-scanning cross section may be used instead.

As described above, the light scanning apparatus 100 according to the present embodiment employs the OFS system in which the incident optical system 75 converts the incident light flux so that the width in the main scanning direction of the light flux which is incident on the deflecting unit 5 is wider than that in the main scanning cross section of the deflecting surface 51.

As shown in FIG. 2, both of the optical axis ($X_i$-axis) of the incident optical system 75 and the optical axis (X-axis) of the imaging optical system 85 are disposed in the main scanning cross section, and the $X_i$-axis forms an incident angle $\theta_i$ with respect to the X-axis.

In other words, the traveling direction LP1 of the light flux when it is incident on the deflecting unit 5 and the optical axis (X-axis) of the imaging optical system 85 are not parallel to each other in the main scanning cross section in the light scanning apparatus 100 according to the present embodiment.

However, both of the $X_i$-axis and the X-axis may not be disposed in the main scanning cross section in the light scanning apparatus 100 according to the present embodiment.

In the light scanning apparatus 100 according to the present embodiment, the scanned surface 7 has a first scanned region 71 (first region) and a second scanned region 72 (second region) on the side where the incident optical system 75 is arranged (light source side) and on the side where the incident optical system 75 is not arranged (opposite light source side), respectively, with an on-axis image height 711 (Y=0) therebetween.

That is, when coordinates in the Y direction of the outermost off-axis image height 710 at the +Y side, the on-axis image height 711 and the outermost off-axis image height 712 at the −Y side are $Y_{max+}$, 0 and $Y_{max-}$, respectively, the first scanned region 71 is a region having a length $|Y_{max+}|$ (an absolute value of $Y_{max+}$) from the outermost off-axis image height 710 at the +Y side to the on-axis image height 711.

Further, the second scanned region 72 is a region having a length $|Y_{max-}|$ (an absolute value of $Y_{max-}$) from the outermost off-axis image height 712 at the −Y side to the on-axis image height 711.

In the light scanning apparatus 100 according to the present embodiment, the light flux deflected by the deflecting unit 5 is condensed on the scanned surface 7 by the imaging optical system 85 to form a beam spot. Thereby, the region between the outermost off-axis image height 710 at the +Y side and the outermost off-axis image height 712 at the −Y side is scanned by rotating the deflecting unit 5.

In the light scanning apparatus 100 according to the present embodiment, the following inequality (1) is satisfied.

$$|Y_{max+}| > |Y_{max-}| \tag{1}$$

The power of the imaging optical system 85 can be monotonically changed from the optical axis to an outside of the optical axis by setting the distance $|Y_{max+}|$ between the on-axis image height 711 and the outermost off-axis image height 710 at the +Y side so as to become larger than the distance $|Y_{max-}|$ between the on-axis image height 711 and the outermost off-axis image height 712 at the −Y side to satisfy the inequality (1).

Then, as described in detail later, a monotonical change of the light flux width accompanied by a monotonical change of a reflection angle of the light flux by the deflecting surface 51 can be canceled to suppress a change of a spot diameter by monotonically changing the power of the imaging optical system 85.

In the light scanning apparatus 100 according to the present embodiment, the second scanned region 72 may not be provided, namely $Y_{max-}$ may be set to 0, thereby the first scanned region 71 may be set to the scanned region of the scanned surface 7.

By setting the scanned region of the scanned surface 7 in this way, it is not necessary to design the first imaging lens 61 and the second imaging lens 62 forming the imaging optical system 85 asymmetrically with respect to the optical axis, so that a printed position can be designed with a high accuracy.

Next, a specification of the light scanning apparatus 100 according to the present embodiment is described in the following Tables 1-1 to 1-3. In Table 1-3, "E-x" means "$10^{-x}$".

TABLE 1-1

| | |
|---|---|
| Wavelength λ of the light source 1 (nm) | 790 |
| Angle θi between the optical axis of the incident optical system 75 and that of the imaging optical system 85 (deg) | 63 |
| Circumscribed diameter φ of the deflecting unit 5 (mm) | 13.0 |
| Number N of surfaces of the deflecting unit 5 | 10 |
| Width W0 in the main scanning cross section of the deflecting surface 51 (mm) | 4.017 |
| Distance between the center of the deflecting unit 5 and the deflecting surface 51 (mm) | 6.182 |
| X coordinate of the rotation center of the deflecting unit 5 | −5.271 |
| Y coordinate of the rotation center of the deflecting unit 5 | −3.230 |
| Fθ coefficient | 210.0 |
| DIST coefficient α2 | 0.0 |
| DIST coefficient α3 | 22.1 |
| DIST coefficient α4 | 0.0 |
| |Ymax+| (mm) | 192 |
| |Ymax−| (mm) | 32 |
| Rotation angle of deflecting unit 5 between Y = 0 and Y = Ymax+ (deg) | 24.343 |
| Angle of view θmax+ of a beam traveling to Ymax+ (deg) | 48.686 |
| Rotation angle of deflecting unit 5 between Y = 0 and Y = Ymax− (deg) | −4.356 |
| Angle of view θmax− of a beam traveling to Ymax− (deg) | −8.712 |

TABLE 1-2

| | Surface number | R | N | X | Y | Z | gx(x) | gx(y) | gx(z) |
|---|---|---|---|---|---|---|---|---|---|
| Light source 1 | 1 | 0.000 | 1.0000 | 63.559 | 124.741 | 0.000 | 0.454 | 0.891 | 0.000 |
| Cover glass | 2 | 0.000 | 1.0000 | 63.445 | 124.518 | 0.000 | 0.454 | 0.891 | 0.000 |
| Stop 2 | 3 | 0.000 | 1.0000 | 51.301 | 100.684 | 0.000 | 0.454 | 0.891 | 0.000 |
| Incident surface of coupling lens 3 | 4 | 0.000 | 2.0000 | 50.847 | 99.793 | 0.000 | 0.454 | 0.891 | 0.000 |
| Exit surface of coupling lens 3 | 5 | aspherical surface | 1.0000 | 49.485 | 97.120 | 0.000 | 0.454 | 0.891 | 0.000 |
| Deflecting surface 51 of deflecting unit 5 | 6 | 0.000 | 1.0000 | 0.000 | 0.000 | 0.000 | 0.853 | 0.523 | 0.000 |
| Incident surface of first imaging lens 61 | 7 | aspherical surface | 1.5240 | 47.000 | 0.000 | 0.000 | 1.000 | 0.000 | 0.000 |
| Exit surface of first imaging lens 61 | 8 | aspherical surface | 1.0000 | 54.400 | 0.000 | 0.000 | 1.000 | 0.000 | 0.000 |
| Incident surface of second imaging lens 62 | 9 | aspherical surface | 1.5240 | 63.200 | 0.000 | 0.000 | 1.000 | 0.000 | 0.000 |
| Exit surface of second imaging lens 62 | 10 | aspherical surface | 1.0000 | 71.200 | 0.000 | 0.000 | 1.000 | 0.000 | 0.000 |
| Scanned surface 7 | 11 | 0.000 | — | 239.200 | 0.000 | 0.000 | 1.000 | 0.000 | 0.000 |

Size of Stop 2:

Main scanning 14.0 mm × sub-scanning 2.52 mm

TABLE 1-3

| Exit surface of coupling lens 3 (Surface Number 5) | | | | | | |
|---|---|---|---|---|---|---|
| Ru | Ku | B2u | B4u | B6u | B8u | B10u |
| 2.79E+01 | 0.00E+00 | 0.00E+00 | −5.05E−06 | 0.00E+00 | 0.00E+00 | 0.00E+00 |
| Rl | Kl | B2l | B4l | B6l | B8l | B10l |
| 2.79E+01 | 0.00E+00 | 0.00E+00 | −5.05E−06 | 0.00E+00 | 0.00E+00 | 0.00E+00 |

TABLE 1-3-continued

| ru | E2u | E4u | E6u | E8u | E10u |
|---|---|---|---|---|---|
| 2.32E+01 | 0.00E+00 | 0.00E+00 | 0.00E+00 | 0.00E+00 | 0.00E+00 |
| rl | E2l | E4l | E6l | E8l | E10l |
| 2.32E+01 | 0.00E+00 | 0.00E+00 | 0.00E+00 | 0.00E+00 | 0.00E+00 |
| Incident surface of first imaging lens 61 (Surface Number 7) | | | | | |
| Ru | Ku | B2u | B4u | B6u | B8u | B10u |
| 3.33E+02 | −6.10E+01 | 0.00E+00 | −5.03E−07 | 7.67E−11 | −9.99E−15 | 0.00E+00 |
| Rl | Kl | B2l | B4l | B6l | B8l | B10l |
| 3.33E+02 | −6.10E+01 | 0.00E+00 | −5.03E−07 | 7.67E−11 | −9.99E−15 | 0.00E+00 |
| ru | E2u | E4u | E6u | E8u | E10u |
| −2.00E+01 | −9.45E−06 | −1.25E−08 | 4.17E−12 | −5.88E−16 | 0.00E+00 |
| rl | E2l | E4l | E6l | E8l | E10l |
| −2.00E+01 | −9.45E−06 | −1.25E−08 | 4.17E−12 | −5.88E−16 | 0.00E+00 |
| Exit surface of first imaging lens 61 (Surface Number 8) | | | | | |
| Ru | Ku | B2u | B4u | B6u | B8u | B10u |
| −1.44E+04 | 4.85E+04 | 0.00E+00 | −2.63E−07 | −4.17E−11 | 3.63E−15 | 0.00E+00 |
| Rl | Kl | B2l | B4l | B6l | B8l | B10l |
| −1.44E+04 | 4.85E+04 | 0.00E+00 | −2.63E−07 | −4.17E−11 | 3.63E−15 | 0.00E+00 |
| ru | E2u | E4u | E6u | E8u | E10u |
| 6.63E+01 | −5.72E−05 | 5.70E−09 | 1.56E−13 | −1.92E−16 | 0.00E+00 |
| rl | E2l | E4l | E6l | E8l | E10l |
| 6.63E+01 | −5.72E−05 | 5.70E−09 | 1.56E−13 | −1.92E−16 | 0.00E+00 |
| Incident surface of second imaging lens 62 (Surface Number 9) | | | | | |
| Ru | Ku | B2u | B4u | B6u | B8u | B10u |
| 2.31E+02 | −1.48E+01 | 0.00E+00 | −1.45E−07 | 0.00E+00 | 0.00E+00 | 0.00E+00 |
| Rl | Kl | B2l | B4l | B6l | B8l | B10l |
| 2.31E+02 | −1.48E+01 | 0.00E+00 | −1.45E−07 | 0.00E+00 | 0.00E+00 | 0.00E+00 |
| ru | E2u | E4u | E6u | E8u | E10u |
| 4.17E+01 | −8.59E−06 | −2.08E−09 | −9.82E−14 | 3.91E−17 | 0.00E+00 |
| rl | E2l | E4l | E6l | E8l | E10l |
| 4.17E+01 | −8.59E−06 | −2.08E−09 | −9.82E−14 | 3.91E−17 | 0.00E+00 |
| Exit surface of second imaging lens 62 (Surface Number 10) | | | | | |
| Ru | Ku | B2u | B4u | B6u | B8u | B10u |
| 4.29E+02 | 2.01E+00 | 0.00E+00 | −3.62E−07 | 3.86E−11 | −3.12E−15 | 0.00E+00 |
| Rl | Kl | B2l | B4l | B6l | B8l | B10l |
| 4.29E+02 | 2.01E+00 | 0.00E+00 | −3.62E−07 | 3.86E−11 | −3.12E−15 | 0.00E+00 |
| ru | E2u | E4u | E6u | E8u | E10u |
| −2.15E+01 | 1.78E−05 | −6.95E−09 | 4.94E−13 | −1.12E−17 | 0.00E+00 |
| rl | E2l | E4l | E6l | E8l | E10l |
| −2.15E+01 | 1.78E−05 | −6.95E−09 | 4.94E−13 | −1.12E−17 | 0.00E+00 |

In the light scanning apparatus 100 according to the present embodiment, respective meridional line shapes (shapes in the main scanning cross section) of an exit surface of the coupling lens 3, and an incident surface and an exit surface of each of the first imaging lens 61 and the second imaging lens 62 are represented by the following expression (2):

$$X = \frac{\frac{Y^2}{R}}{1+\sqrt{1-(1+K)\left(\frac{Y}{R}\right)^2}} + B_4 Y^4 + B_6 Y^6 + B_8 Y^8 + B_{10} Y^{10}. \quad (2)$$

In the expression (2), a local coordinate system is used in which a surface vertex which is an intersection point with an optical axis of each lens surface (optical surface) is set as an origin, and the traveling direction (namely, the optical axis) of the light flux is set as an X-axis, an axis orthogonal to the X-axis in the main scanning cross section is set as a Y-axis, and an axis orthogonal to the X-axis in the sub-scanning cross section is set as a Z-axis.

In particular, each of the lens surfaces of the first imaging lens 61 and the second imaging lens 62 has an aspherical surface shape expressed by a function up to 10th order with respect to Y.

Further, R represents a curvature radius (curvature radius of meridional line) in the main scanning cross section, and K, $B_4$, $B_6$, $B_8$ and $B_{10}$ represent aspherical surface coefficients in the expression (2).

Values of the aspherical surface coefficients $B_4$, $B_6$, $B_8$ and $B_{10}$ may be different between the +Y side and the −Y side.

Thereby, the meridional line shape of the optical surface can be made asymmetric across the optical axis in the main scanning direction.

In the above-described Table 1-3, the aspherical surface coefficients at the +Y side (light source side) are represented by $B_{4u}$, $B_{6u}$, $B_{8u}$, and $B_{10u}$, and the aspherical surface coefficients at the −Y side (opposite light source side) are represented by $B_{4l}$, $B_{6l}$, $B_{8l}$ and $B_{10l}$.

Further, respective sagittal line shapes (shape in the sub-scanning cross section) of the exit surface of the coupling lens 3, and the incident surface and the exit surface of each of the first imaging lens 61 and the second imaging lens 62 are represented by the following expression (3):

$$S = \frac{\frac{Z^2}{r'}}{1+\sqrt{1-\left(\frac{Z}{r'}\right)^2}} + \sum_{j,k} M_{jk} Y^j Z^k. \quad (3)$$

Here, the sagittal line shape indicates a surface shape in a cross section including a surface normal on the meridional line at each position in the main scanning direction and being perpendicular to the main scanning cross section.

Further, $M_{jk}$ are aspherical surface coefficients in the expression (3). In the light scanning apparatus 100 according to the present embodiment, all of the aspherical surface coefficients $M_{jk}$ are 0 in any optical surface, but the disclosure is not limited thereto. In order to reduce various aberrations, at least one aspherical surface coefficient $M_{jk}$ may be set to a value other than 0.

Specifically, a first order term with respect to Z is a term contributing to a tilt amount (tilt amount of sagittal line) in the sub-scanning cross section of the optical surface in the expression (3).

Therefore, the tilt amount of the sagittal line can be changed asymmetrically in the main scanning direction by making the aspherical coefficients from $M_{0\_1u}$ to $M_{16\_1u}$ at the +Y side (light source side) and the aspherical coefficients from $M_{0\_1l}$ to $M_{16\_1l}$ at the −Y side (opposite light source side) be different from each other.

In addition, r' shown in the expression (3) represents the curvature radius (curvature radius of sagittal line) in the sub-scanning cross section at a position away from the optical axis by Y in the main scanning direction, and is represented by the following expression (4):

$$\frac{1}{r'} = \frac{1}{r} + E_2 Y^2 + E_4 Y^4 + E_6 Y^6 + E_8 Y^8 + E_{10} Y^{10}. \quad (4)$$

In the expression (4), r represents the curvature radius of the sagittal line on the optical axis, and $E_2$, $E_4$, $E_6$, $E_8$ and $E_{10}$ represent aspherical surface coefficients (variation coefficients of sagittal line).

Values of the aspherical surface coefficients from $E_2$ to $E_{10}$ may be different between the +Y side and the −Y side.

Thereby, an aspherical surface amount of the sagittal line shape can be set asymmetrically across the optical axis in the main scanning direction.

In the above-described Table 1-3, the aspherical surface coefficients at the +Y side (light source side) are represented by $E_{2u}$, $E_{4u}$, $E_{6u}$, $E_{8u}$ and $E_{10u}$, and the aspherical surface coefficients at the −Y side (opposite light source side) are represented by $E_{2l}$, $E_{4l}$, $E_{6l}$, $E_{8l}$ and $E_{10l}$.

Further, although the expression (4) includes even order terms with respect to Y, odd order terms with respect to Y may be added.

Next, characteristic structures of the light scanning apparatus 100 according to the present embodiment are described.

As shown in FIG. 2, the optical axis ($X_i$-axis) of the incident optical system 75 intersects the optical axis (X-axis) of the imaging optical system 85 with forming an angle of $\theta_i$ at the origin O in the main scanning cross section.

When an angle formed by the normal line LP2 of the deflecting surface 51 of the deflecting unit 5 with respect to the optical axis of the imaging optical system 85 is defined as $\theta_p$, the angle $\theta_p$ changes by the rotation of the deflecting unit 5.

Further, when an angle (angle of view) formed by a traveling direction of principal ray of the light flux when it is deflected by the deflecting surface 51 with respect to the optical axis of the imaging optical system 85 is defined as $\theta$, the angle of view $\theta$ changes from $\theta_{max+}$ to $\theta_{max-}$.

Here, $\theta_{max+}$ represents an angle formed by the traveling direction of the principal ray of the light flux L10 with respect to the optical axis of the imaging optical system 85 when it is deflected toward the outermost off-axis image height 710 by the deflecting surface 51.

Further, $\theta_{max-}$ represents an angle formed by the traveling direction of the principal ray of the light flux L12 with respect to the optical axis of the imaging optical system 85 when it is deflected toward the outermost off-axis image height 712 by the deflecting surface 51.

At this time, a relation represented by the following expression (5) is satisfied between the angles $\theta_i$, $\theta_p$ and $\theta$:

$$\theta_p = \frac{\theta_i + \theta}{2}. \tag{5}$$

As shown in Table 1-1, $\theta_{max_-}$ and $\theta_i$ are set to $-8.712°$ ($-0.152$ radians) and $63°$ (1.100 radians), respectively, and the number N of the deflecting surfaces 51 of the deflecting unit 5 is 10 in the light scanning apparatus 100 according to the present embodiment.

Therefore, the following inequality (6) is satisfied in the light scanning apparatus 100 according to the present embodiment:

$$\theta_i - \theta_{max_-} < \frac{4\pi}{N}. \tag{6}$$

If the inequality (6) is not satisfied, when the scanned surface 7 is scanned by the light flux reflected by a predetermined deflecting surface 51 of the deflecting unit 5, the light flux reflected by an adjacent deflecting surface 51 reaches the scanned region on the scanned surface 7 as a ghost, which is not preferable.

As described above, the outermost off-axis image heights 712 and 710 are set asymmetrically with respect to the optical axis such that the inequality (6) is satisfied in the light scanning apparatus 100 according to the present embodiment.

As described above, the light scanning apparatus 100 according to the present embodiment uses the OFS system in which the deflecting surface 51 deflects the incident light flux having a wide width in the main scanning direction with moving in the incident light flux.

Therefore, the width in the main scanning direction of the light flux toward each image height on the scanned surface 7 changes according to the reflection angle $\theta$ by the deflecting surface 51.

Specifically, the width in the main scanning direction of the light flux incident on each position in the main scanning direction of the imaging optical system 85 increases monotonically from the light flux incident on the on-axis position of the imaging optical system 85 toward the on-axis image height 711 to the light flux incident on a predetermined off-axis position (outermost off-axis position) of the imaging optical system 85 toward the outermost off-axis image height 710.

On the other hand, each of the first imaging lens 61 and the second imaging lens 62 forming the imaging optical system 85 has an aspherical surface shape and is designed so as to have a different focal length according to the position in the main scanning direction.

Specifically, the focal length at each position in the main scanning direction of the imaging optical system 85 increases monotonically from a position (on-axis position, first position) through which the principal ray (on-axis ray) of the light flux (on-axis light flux) toward the on-axis image height 711 passes to a position (outermost off-axis position, second position) through which the principal ray (outermost off-axis ray) of the light flux (outermost off-axis light flux) toward the outermost off-axis image height 710 passes (namely, a power (refractive power) decreases monotonically).

Therefore, a distance by which the spot moves on the scanned surface 7 by rotating the deflecting unit 5 per unit time increases monotonically from the on-axis image height 711 to the outermost off-axis image height 710.

That is, the imaging optical system 85 has a scanning characteristic with non-constant speed in the light scanning apparatus 100 according to the present embodiment.

As described in detail below, it is possible to suppress a change of spot diameter in the main scanning direction among each image height on the scanned surface 7 by employing the above-described structures in the light scanning apparatus 100 according to the present embodiment.

As described above, the width in the main scanning direction (in the main scanning cross section) of the light flux deflected by the deflecting surface 51 varies according to the angle of view $\theta$ since the light scanning apparatus 100 according to the present embodiment employs the OFS system.

Here, when a circumscribed circle diameter of the deflecting unit 5 and the number of the deflecting surfaces 51 of the deflecting unit 5 are represented by $\varphi$ and N, respectively, the width $W_0$ in the main scanning cross section of the deflecting surface 51 is represented by the following expression (7):

$$W_0 = \phi \sin\left(\frac{180°}{N}\right). \tag{7}$$

Further, the width W in the main scanning direction of the light flux deflected by the deflecting surface 51 is represented by the following expression (8) since an angle formed by the optical axis of the incident optical system 75 with respect to the normal line LP2 of the deflecting surface 51 is $\theta_i - \theta_p$:

$$W = W_0 \cos(\theta_i - \theta_p) \tag{8}.$$

Substituting the expression (5) into the expression (8), the following expression (9) is obtained:

$$W(\theta) = W_0 \cos\left(\frac{\theta_i - \theta}{2}\right). \tag{9}$$

That is, from expression (8), the width in the main scanning direction of the light flux incident on each position in the main scanning direction of the imaging optical system 85 increases monotonically from the light flux deflected toward the on-axis image height 711 to the light flux deflected toward the outermost off-axis image height 710, namely as the angle $\theta_p$ (angle $\theta$ in the expression (9)) increases.

Further, a spot diameter SPOT in the main scanning direction at each image height on the scanned surface 7 is represented by the following expression (10):

$$SPOT = \frac{K \times \lambda \times f}{W}. \tag{10}$$

In the expression (10), K represents a constant, $\lambda$ represents a wavelength of the light flux emitted from the light source 1, f represents the focal length of the imaging optical system 85, and W represents the width in the main scanning direction of the light flux incident on the imaging optical system 85.

The constant K is estimated as about 1.42 when a cross-sectional shape of the light flux incident on the imaging optical system 85 is rectangular.

Here, the following expression (11) can be obtained by substituting the expression (9) into the expression (10) since the light scanning apparatus 100 according to the present embodiment employs the OFS system and the width W is represented by the expression (9):

$$SPOT(\theta) = \frac{K \times \lambda \times f}{W(\theta)} = \frac{K \times \lambda \times f}{W_0 \cos\left(\frac{\theta_i - \theta}{2}\right)}. \quad (11)$$

Next, in a conventional light scanning apparatus using the OFS system, the image height Y has a distortion characteristic (hereinafter referred to as a DIST characteristic) as represented by the following expression (12).

$$Y = F\theta \quad (12)$$

Here, F is referred to as an Fθ coefficient, and is equal to the focal length f(θ=0) at the on-axis position of the imaging optical system 85.

That is, there is a constant scanning speed relation as expressed by the following expression (13) between a variation amount dθ of the angle of view θ by the deflecting unit 5 rotating at a constant speed per unit time and the distance dY by which the spot moves to scan the scanned surface 7 in the conventional light scanning apparatus using the OFS system:

$$\frac{dY}{d\theta} = F. \quad (13)$$

Here, dY/dθ can also be referred to as a moving distance per unit time of the spot, namely a moving speed of the spot since the deflecting unit 5 rotates at a constant speed.

In other words, dY/dθ can also be referred to as a distance by which the light flux scans on the scanned surface 7 per unit time, namely a scanning speed of the light flux on the scanned surface 7.

Here, a ratio of the width in the main scanning direction of the light flux incident on each position in the main scanning direction of the imaging optical system 85 to the width in the main scanning direction of the light flux incident on the on-axis position of the imaging optical system 85 is represented by dW(θ).

Further, the ratio of the spot diameter in the main scanning direction at each image height on the scanned surface 7 to the spot diameter in the main scanning direction at the on-axis image height on the scanned surface 7 is represented by dSPOT(θ).

At this time, the following expression (14) is obtained based on expression (11):

$$dSPOT(\theta) = \frac{1}{dW(\theta)}. \quad (14)$$

As described above, the ratio dSPOT(θ) of the spot diameter at each angle of view depends on the ratio dW(θ) of the light flux width at each angle of view according to the expression (14) in the conventional light scanning apparatus using the OFS system.

Figure 3A:
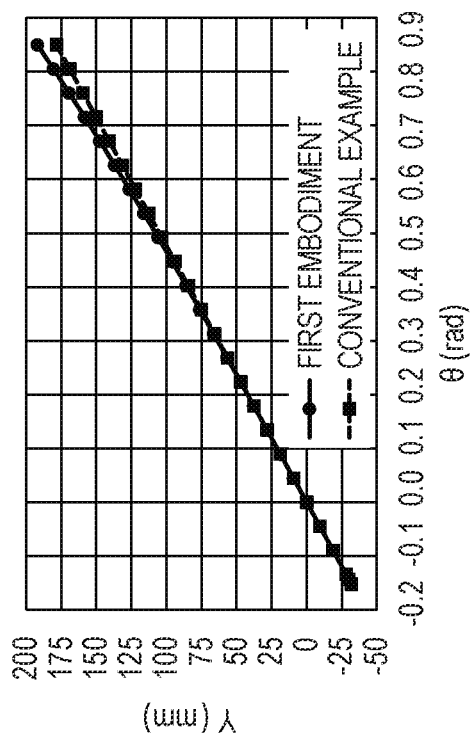
FIG. 3A is a diagram showing a dependence of a spot diameter ratio with respect to an angle of view in the light scanning apparatus according to the first embodiment.

The dependence of the ratio dSPOT of the spot diameter with respect to the angle of view θ is shown by a broken line in FIG. 3A based on the expression (14).

As shown in FIG. 3A, the dSPOT varies by about 23% over an entire region of the angle of view θ, so that the variation of the width W is a contributing factor of the variation of the spot diameter SPOT in the main scanning direction in the conventional light scanning apparatus using the OFS system.

On the other hand, the light scanning apparatus 100 according to the present embodiment has the DIST characteristic represented by the following expression (15):

$$Y = F\theta + \alpha_2\theta^2 + \alpha_3\theta^3 + \alpha_4\theta^4 + \alpha_5\theta^5 + \ldots \quad (15).$$

That is, there is a non-constant scanning speed relation as expressed by the following expression (16) between the variation amount dθ of the angle of view θ by the deflecting unit 5 rotating at a constant speed per unit time and the distance dY by which the spot moves to scan the scanned surface 7, namely the scanning speed of the light flux on the scanned surface 7 varies according to the image height:

$$\frac{dY}{d\theta} = F + 2\alpha_2\theta + 3\alpha_3\theta^2 + 4\alpha_4\theta^3 + 5\alpha_5\theta^4 + \ldots. \quad (16)$$

Figure 3B:
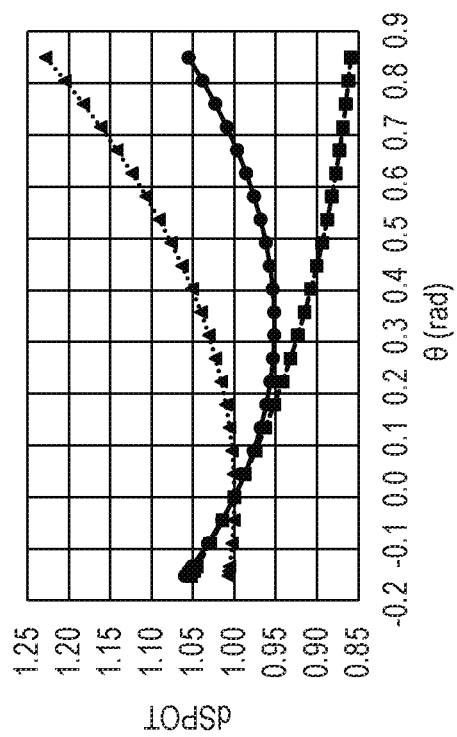
FIG. 3B is a diagram showing a DIST characteristic in the light scanning apparatus according to the first embodiment.

FIG. 3B shows respective DIST characteristics in the conventional light scanning apparatus and the light scanning apparatus 100 according to the present embodiment.

As shown in FIG. 3B, the image height Y varies with respect to the angle of view θ based on a linear function shown by the expression (12) in the conventional light scanning apparatus, while it varies based on a polynomial function shown by the expression (15) in the light scanning apparatus 100 according to the present embodiment.

Respective DIST coefficients $\alpha_i$ are set such that a difference between the respective DIST characteristics increases as the angle of view θ increases.

Figure 3C:
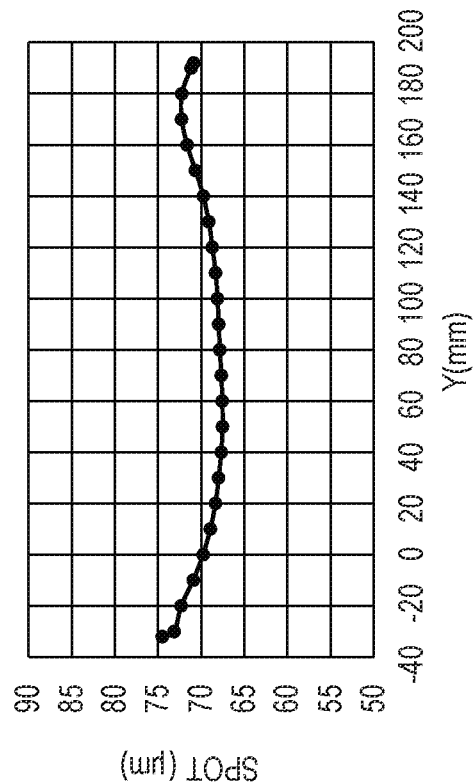
FIG. 3C is a diagram showing a dependence of a spot moving speed with respect to the angle of view in the light scanning apparatus according to the first embodiment.

FIG. 3C shows a dependence of the moving speed dY/dθ with respect to the angle of view θ as shown by the expression (13) in the conventional light scanning apparatus and a dependence of the moving speed dY/dθ with respect to the angle of view θ as shown by the expression (16) in the light scanning apparatus 100 according to the present embodiment.

As shown in FIG. 3C, the moving speed dY/dθ is a constant value F regardless of the angle of view θ in the conventional light scanning apparatus, while the moving speed dY/dθ increases monotonically as the angle of view θ increases in the light scanning apparatus 100 according to the present embodiment.

As described above, the imaging optical system 85 has the DIST characteristic of non-constant scanning speed such that the moving speed dY/dθ increases monotonically as the angle of view θ increases from the on-axis image height 711 to the outermost off-axis image height 710 in the light scanning apparatus 100 according to the present embodiment.

When a ratio of the focal length f(θ) at each position in the main scanning direction of the imaging optical system 85 to the focal length f(θ) at the on-axis position of the imaging optical system 85 is represented by df(θ), the following expression (17) is satisfied:

$$\frac{f(\theta)}{f(0)} = df(\theta) = A \times \frac{dY}{d\theta}. \quad (17)$$

In the expression (17), A represents a constant.

Then, the focal length f(θ) at each position in the main scanning direction of the imaging optical system 85 can be represented by the following expression (18) from the expression (17):

$$f(\theta) = f(0) \times df(\theta) = F \times \left(A \times \frac{dY}{d\theta}\right) = \qquad (18)$$
$$A \times F \times (F + 2\alpha_2\theta + 3\alpha_3\theta^2 + 4\alpha_4\theta^3 + 5\alpha_5\theta^4 + \dots).$$

As described above, the power in the main scanning cross section of the imaging optical system 85 is set to decrease, namely the focal length f(θ) in the main scanning cross section of the imaging optical system 85 is set to increase, as the angle of view θ increases from the on-axis image height 711 to the outermost off-axis image height 710 in the light scanning apparatus 100 according to the present embodiment.

That is, the expressions (11) and (14) can be rewritten as the following expressions (19) and (20) in the light scanning apparatus 100 according to the present embodiment, respectively:

$$SPOT(\theta) = \frac{K \times \lambda \times f(\theta)}{W(\theta)}; \qquad (19)$$

$$dSPOT(\theta) = \frac{df(\theta)}{dW(\theta)}. \qquad (20)$$

At this time, when the light flux width does not change at each angle of view, namely dW(θ) is set to 1, the ratio dSPOT(θ) of the spot diameter at each angle of view depends on the ratio df(θ) of the focal length at each angle of view according to the expression (20).

A dependence of the ratio dSPOT of the spot diameter with respect to the angle of view θ when dW(θ) is set to 1 based on the expression (20) is shown by the dotted line in FIG. 3A.

A dependence of dSPOT with respect to the angle of view θ when both of dW(θ) and df(θ) change based on the expression (20) is shown by a solid line in FIG. 3A.

As shown in FIG. 3A, it can be seen that a change of the ratio dSPOT(θ) of the spot diameter when the ratio dW(θ) of the light flux width changes and a change of the ratio dSPOT(θ) of the spot diameter when the ratio df(θ) of the focal length changes cancel out each other.

Specifically, it can be seen that a variation width of the ratio dSPOT(θ) of the spot diameter which is about 23% over the entire region of the angle of view θ due to a change in the ratio dW(θ) of the light flux width, is reduced to about 11% by changing the ratio df(θ) of the focal length.

That is, the ratio dSPOT(θ) of the spot diameter changes by about 23% over the entire region of the angle of view θ in the conventional light scanning apparatus using the OFS system, while the change in the ratio dSPOT(θ) of the spot diameter can be reduced to about 11% over the entire region of the angle of view θ in the light scanning apparatus 100 according to the present embodiment.

Further, in one embodiment, the light scanning apparatus 100 according to the present embodiment is designed so as to satisfy the following inequality (21) at any angle of view θ from the on-axis image height to the outermost off-axis image height:

$$0.90 < \frac{df(\theta)}{dW(\theta)} < 1.10. \qquad (21)$$

In another embodiment, the light scanning apparatus 100 according to the present embodiment is designed so as to satisfy the following expression (21a) in order to further suppress the change in the ratio dSPOT(θ) of the spot diameter by further canceling out the change in the ratio df(θ) of the focal length by the change in the ratio dW(θ) of the light flux width:

$$0.93 < \frac{df(\theta)}{dW(\theta)} < 1.07. \qquad (21a)$$

The constant A and the DIST coefficients $\alpha_i$ are determined so as to satisfy the inequalities (21) and (21a) in the light scanning apparatus 100 according to the present embodiment.

Figure 3D:
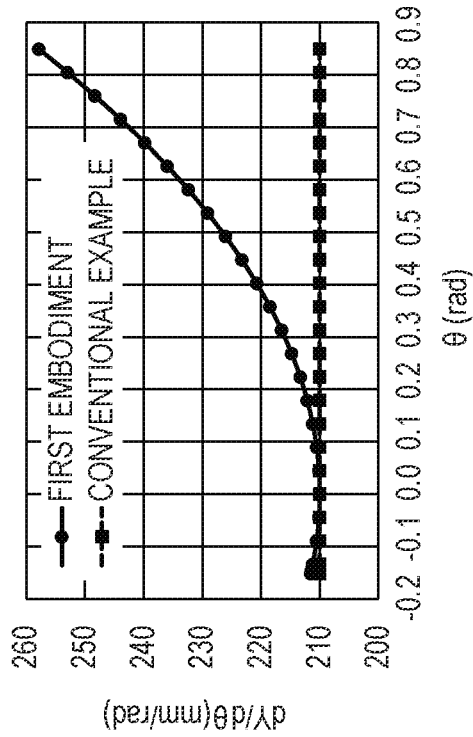
FIG. 3D is a diagram showing a dependence of a spot diameter with respect to an image height in the light scanning apparatus according to the first embodiment.

FIG. 3D shows a magnitude of the spot diameter SPOT in the main scanning direction at each image height on the scanned surface 7 calculated using the specification described in Tables 1-1 to 1-3 in the light scanning apparatus 100 according to the present embodiment.

As shown in FIG. 3D, the spot diameter SPOT has a value between 67.5 micrometers and 74.5 micrometers over the entire image height from the outermost off-axis image height 712 to the outermost off-axis image height 710 in the light scanning apparatus 100 according to the present embodiment.

That is, the spot diameter SPOT has a variation width of about 10.3% over the entire image height.

Here, the reason why the variation width of about 10.3% shown in FIG. 3D is smaller than the reduced variation width of about 11% in the ratio dSPOT(θ) of the spot diameter shown in FIG. 3A is because an influence of residual aberrations, such as a wavefront aberration and a partial magnification, is included in the calculation shown in FIG. 3D.

Further, when a change of a light amount at each image height on the scanned surface 7 in the light scanning apparatus 100 according to the present embodiment is considered, df(θ)/dW(θ) shown in the expression (20) is equivalent to F-number at the angle of view θ.

That is, as described above, it is possible to suppress a change in the F-number of the spot scanning the scanned surface 7 by canceling out the change in the ratio df(θ) of the focal length by the change in the ratio dW(θ) of the light flux width in the light scanning apparatus 100 according to the present embodiment.

Thereby, a non-uniformity in an image plane illuminance distribution can be reduced by suppressing the change of the light amount among respective image heights on the scanned surface 7.

As shown in the expression (1), the angle of view $\theta_{max+}$ toward the outermost off-axis image height 710 and the angle of view $\theta_{max-}$ toward the outermost off-axis image height 712 have asymmetric values across the optical axis of the imaging optical system 85 in the light scanning apparatus 100 according to the present embodiment.

On the other hand, as shown in Table 1-3, the shape of each optical surface of the first imaging lens 61 and that of each optical surface of the second imaging lens 62 are symmetrical across the optical axis of the imaging optical system 85 in the light scanning apparatus 100 according to the present embodiment.

As described above, when the light flux is deflected by the deflecting surface 51 of the deflecting unit 5 to scan the scanned surface 7, the angle of view θ changes from $θ_{max+}$ to $θ_{max-}$ in the light scanning apparatus 100 according to the present embodiment.

Then, the width W in the main scanning direction of the light flux incident on the imaging optical system 85 changes monotonically from $θ_{max+}$ to $θ_{max-}$ as shown in the expression (9).

Accordingly, the focal length f of the imaging optical system 85 is also changed monotonically in order to cancel out the change in the light flux width W by it, as described above.

Here, when values of the angle of view $θ_{max+}$ and $θ_{max-}$ are set so as to be symmetrical across the optical axis of the imaging optical system 85, the shape of each optical surface of the first imaging lens 61 and that of each optical surface of the second imaging lens 62 are designed such that they are significantly asymmetrical across the optical axis of the imaging optical system 85 in order to change the focal length f monotonically.

Therefore, in order to reduce a burden in manufacturing such asymmetric optical surfaces, the values of the angle of view $θ_{max+}$ and $θ_{max-}$ are set to so as to be asymmetrical across the optical axis of the imaging optical system 85 in the light scanning apparatus 100 according to the present embodiment.

Then, as shown in the expression (1), a distance $|Y_{max+}|$ between the on-axis image height 711 and the outermost off-axis image height 710 is set so as to be larger than the distance $|Y_{max-}|$ between the on-axis image height 711 and the outermost off-axis image height 712 in the light scanning apparatus 100 according to the present embodiment.

That is, the angle of view $θ_{max+}$ toward the outermost off-axis image height 710 at the light source side where the incident optical system 75 is arranged is increased, while the angle of view $θ_{max-}$ toward the outermost off-axis image height 712 at the opposite light source side is decreased, thereby a downsizing of the apparatus is achieved.

Further, each of the DIST coefficients $α_2, α_4, \ldots$ in the even-order terms may be set to 0, while each of the DIST coefficients $α_3, α_5, \ldots$ in the odd-order terms may be set to a predetermined constant in the polynomial equation expressing the DIST characteristic represented by the expression (15) in order to make the shape of each optical surface of the first imaging lens 61 and the second imaging lens 62 be symmetrical across the optical axis of the imaging optical system 85 in the light scanning apparatus 100 according to the present embodiment.

As described above, it is possible to suppress the variation of the spot diameter occurring in the OFS system employed for achieving the printing with a high definition at a high speed without increasing the number of components, and to reduce the non-uniformity in the image plane illuminance distribution in the light scanning apparatus 100 according to the present embodiment.

Second Embodiment

Figure 4:
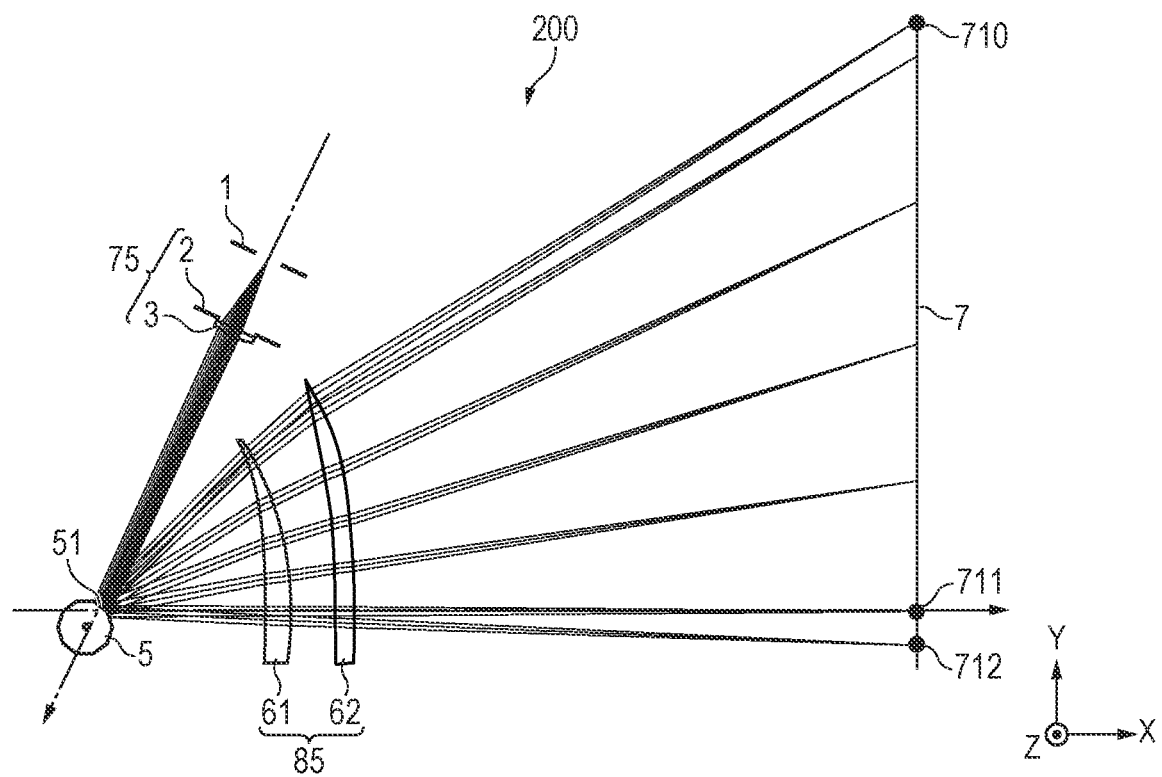
FIG. 4 is a main scanning cross-sectional view of an light scanning apparatus according to a second embodiment of the disclosure.

FIG. 4 shows a main scanning cross-sectional view of the light scanning apparatus 200 according to a second embodiment of the disclosure.

The light scanning apparatus 200 according to the present embodiment has the same structure as the light scanning apparatus 100 according to the first embodiment, so that the same members are denoted by the same reference numerals and description thereof is omitted.

A specification of the light scanning apparatus 200 according to the present embodiment is described in the following Tables 2-1 to 2-3.

TABLE 2-1

| | |
|---|---|
| Wavelength λ (nm) of the light source 1 | 790 |
| Angle θi between the optical axis of the incident optical system 75 and that of the imaging optical system 85 (deg) | 65 |
| Circumscribed diameter φ of the deflecting unit 5 (mm) | 15.0 |
| Number N of surfaces of the deflecting unit 5 | 10 |
| Width W0 in the main scanning cross section of the deflecting surface 51 (mm) | 4.635 |
| Distance between the center of the deflecting unit 5 and the deflecting surface 51 (mm) | 7.133 |
| X coordinate of the rotation center of the deflecting unit 5 | −6.016 |
| Y coordinate of the rotation center of the deflecting unit 5 | −3.833 |
| Fθ coefficient | 240.0 |
| DIST coefficient α2 | 38.0 |
| DIST coefficient α3 | −10.5 |
| DIST coefficient α4 | 0.0 |
| |Ymax+| (mm) | 212 |
| |Ymax−| (mm) | 12 |
| Rotation angle of deflecting unit 5 between Y = 0 and Y = Ymax+ (deg) | 23.039 |
| Angle of view θmax+ of a beam traveling to Ymax+ (deg) | 46.079 |
| Rotation angle of deflecting unit 5 between Y = 0 and Y = Ymax− (deg) | −1.445 |
| Angle of view θmax− of a beam traveling to Ymax− (deg) | −2.891 |

TABLE 2-2

| | Surface Number | R | N | X | Y | Z | gx(x) | gx(y) | gx(z) |
|---|---|---|---|---|---|---|---|---|---|
| Light source 1 | 1 | 0.000 | 1.0000 | 59.167 | 126.883 | 0.000 | 0.423 | 0.906 | 0.000 |
| Cover glass | 2 | 0.000 | 1.0000 | 59.061 | 126.657 | 0.000 | 0.423 | 0.906 | 0.000 |
| Stop 2 | 3 | 0.000 | 1.0000 | 47.756 | 102.413 | 0.000 | 0.423 | 0.906 | 0.000 |
| Incident surface of coupling lens 3 | 4 | 0.000 | 2.0000 | 47.333 | 101.506 | 0.000 | 0.423 | 0.906 | 0.000 |
| Exit surface of coupling lens 3 | 5 | aspherical surface | 1.0000 | 46.065 | 98.788 | 0.000 | 0.423 | 0.906 | 0.000 |
| Deflecting surface 51 of deflecting unit 5 | 6 | 0.000 | 1.0000 | −0.150 | 0.225 | 0.000 | 0.822 | 0.569 | 0.000 |
| Incident surface of first imaging lens 61 | 7 | aspherical surface | 1.5240 | 58.000 | 0.000 | 0.000 | 1.000 | 0.000 | 0.000 |

TABLE 2-2-continued

|  | Surface Number | R | N | X | Y | Z | gx(x) | gx(y) | gx(z) |
|---|---|---|---|---|---|---|---|---|---|
| Exit surface of first imaging lens 61 | 8 | aspherical surface | 1.0000 | 67.200 | 0.000 | 0.000 | 1.000 | 0.000 | 0.000 |
| Incident surface of second imaging lens 62 | 9 | aspherical surface | 1.5240 | 83.200 | 0.000 | 0.000 | 1.000 | 0.000 | 0.000 |
| Exit surface of second imaging lens 62 | 10 | aspherical surface | 1.0000 | 89.900 | 0.000 | 0.000 | 1.000 | 0.000 | 0.000 |
| Scanned surface 7 | 11 | 0.000 | — | 291.900 | 0.000 | 0.000 | 1.000 | 0.000 | 0.000 |

Size of Stop 2
Main scanning 14.0 mm × sub-scanning 2.52 mm

TABLE 2-3

| Exit surface of coupling lens 3 (Surface Number 5) | | | | | | |
|---|---|---|---|---|---|---|
| Ru | Ku | B2u | B4u | B6u | B8u | B10u |
| 2.83E+01 | 0.00E+00 | 0.00E+00 | −4.81E−06 | 0.00E+00 | 0.00E+00 | 0.00E+00 |
| Rl | Kl | B2l | B4l | B6l | B8l | B10l |
| 2.83E+01 | 0.00E+00 | 0.00E+00 | −4.81E−06 | 0.00E+00 | 0.00E+00 | 0.00E+00 |
| ru | E2u | E4u | E6u | E8u | E10u | |
| 2.32E+01 | 0.00E+00 | 0.00E+00 | 0.00E+00 | 0.00E+00 | 0.00E+00 | |
| rl | E2l | E4l | E6l | E8l | E10l | |
| 2.32E+01 | 0.00E+00 | 0.00E+00 | 0.00E+00 | 0.00E+00 | 0.00E+00 | |

| Incident surface of first imaging lens 61 (Surface Number 7) | | | | | | |
|---|---|---|---|---|---|---|
| Ru | Ku | B2u | B4u | B6u | B8u | B10u |
| −2.94E+02 | −5.31E+02 | 0.00E+00 | −6.45E−07 | 5.07E−11 | −6.63E−15 | 0.00E+00 |
| Rl | Kl | B2l | B4l | B6l | B8l | B10l |
| −2.94E+02 | −5.31E+02 | 0.00E+00 | −6.45E−07 | 5.07E−11 | −6.63E−15 | 0.00E+00 |
| ru | E2u | E4u | E6u | E8u | E10u | |
| −3.71E+01 | −6.55E−05 | −3.10E−09 | −9.52E−13 | 0.00E+00 | 0.00E+00 | |
| rl | E2l | E4l | E6l | E8l | E10l | |
| −3.71E+01 | −6.55E−05 | −3.10E−09 | −9.52E−13 | 0.00E+00 | 0.00E+00 | |

| Exit surface of first imaging lens 61 (Surface Number 8) | | | | | | |
|---|---|---|---|---|---|---|
| Ru | Ku | B2u | B4u | B6u | B8u | B10u |
| −1.26E+02 | 4.58E−02 | 0.00E+00 | −8.90E−08 | −1.28E−11 | 2.78E−15 | 0.00E+00 |
| Rl | Kl | B2l | B4l | B6l | B8l | B10l |
| −1.26E+02 | 4.58E−02 | 0.00E+00 | −8.90E−08 | −1.28E−11 | 2.78E−15 | 0.00E+00 |
| ru | E2u | E4u | E6u | E8u | E10u | |
| 8.82E+01 | −5.90E−05 | −5.27E−09 | −5.28E−13 | 0.00E+00 | 0.00E+00 | |
| rl | E2l | E4l | E6l | E8l | E10l | |
| 8.82E+01 | −5.90E−05 | −5.27E−09 | −5.28E−13 | 0.00E+00 | 0.00E+00 | |

TABLE 2-3-continued

Incident surface of second imaging lens 62 (Surface Number 9)

| Ru | Ku | B2u | B4u | B6u | B8u | B10u |
|---|---|---|---|---|---|---|
| −2.75E+02 | −8.89E+00 | 0.00E+00 | 0.00E+00 | 0.00E+00 | 0.00E+00 | 0.00E+00 |
| Rl | Kl | B2l | B4l | B6l | B8l | B10l |
| −2.75E+02 | −8.89E+00 | 0.00E+00 | 0.00E+00 | 0.00E+00 | 0.00E+00 | 0.00E+00 |
| ru | E2u | E4u | E6u | E8u | E10u | |
| 4.34E+01 | −4.47E−06 | −1.52E−09 | 1.13E−13 | 0.00E+00 | 0.00E+00 | |
| rl | E2l | E4l | E6l | E8l | E10l | |
| 4.34E+01 | −4.47E−06 | −1.52E−09 | 1.13E−13 | 0.00E+00 | 0.00E+00 | |

Exit surface of second imaging lens 62 (Surface Number 10)

| Ru | Ku | B2u | B4u | B6u | B8u | B10u |
|---|---|---|---|---|---|---|
| −2.30E+02 | −1.58E+02 | 0.00E+00 | −2.81E−07 | 9.98E−12 | −9.60E−16 | 0.00E+00 |
| Rl | Kl | B2l | B4l | B6l | B8l | B10l |
| −2.30E+02 | −1.58E+02 | 0.00E+00 | −2.81E−07 | 9.98E−12 | −9.60E−16 | 0.00E+00 |
| ru | E2u | E4u | E6u | E8u | E10u | |
| −3.80E+01 | 3.73E−06 | −1.35E−09 | −7.18E−14 | 0.00E+00 | 0.00E+00 | |
| rl | E2l | E4l | E6l | E8l | E10l | |
| −3.80E+01 | 3.73E−06 | −1.35E−09 | −7.18E−14 | 0.00E+00 | 0.00E+00 | |

Here, a definition of a local coordinate system for each optical surface and a definition of a surface shape of each optical surface are the same as those in the light scanning apparatus 100 according to the first embodiment.

Figure 5A:
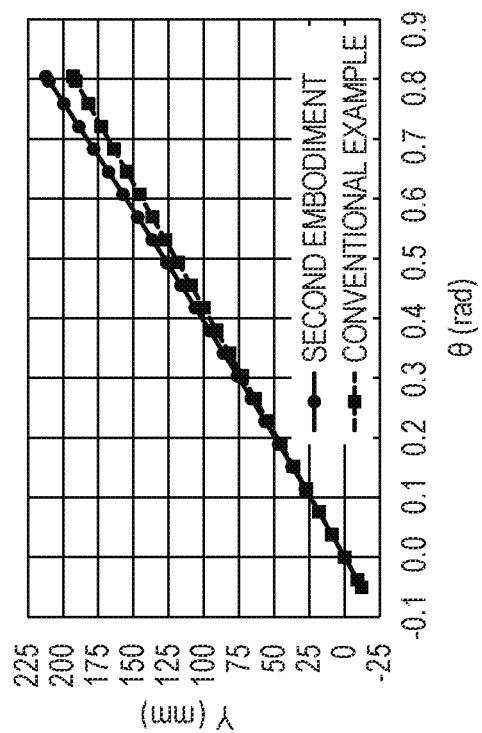
FIG. 5A is a diagram showing a dependence of a spot diameter ratio with respect to an angle of view in the light scanning apparatus according to the second embodiment.

FIG. 5A shows a dependence of the ratio dSPOT of the spot diameter in the main scanning direction with respect to the angle of view θ in the light scanning apparatus 200 according to the present embodiment.

Specifically, the dependence of the ratio dSPOT of the spot diameter with respect to the angle of view θ when the ratio dW(θ) of the light flux width changes based on the expression (14) is shown by a broken line in FIG. 5A.

As shown in FIG. 5A, a variation width of dSPOT over an entire region of the angle of view θ is about 19%, so that it is understood that the variation of the light flux width W is a contributing factor of the variation of the spot diameter SPOT in the main scanning direction.

In the light scanning apparatus 200 according to the present embodiment, similarly to the light scanning apparatus 100 according to the first embodiment, a power in the main scanning cross section of the imaging optical system 85 is set so as to decrease, namely the focal length f(θ) in the main scanning cross section of the imaging optical system 85 is set so as to increase, as the angle of view θ increases from the on-axis image height 711 to the outermost off-axis image height 710.

A dependence of the ratio dSPOT of the spot diameter with respect to the angle of view θ when the light flux width does not change at each angle of view, namely dW(θ) is set to 1 based on the expression (20) is shown by the dotted line in FIG. 5A.

A dependence of dSPOT with respect to the angle of view θ when both of dW(θ) and df(θ) change based on the expression (20) is shown by the solid line in FIG. 5A.

As shown in FIG. 5A, it can be seen that the change in the ratio dSPOT(θ) of the spot diameter when the ratio dW(θ) of the light flux width changes and the change in the ratio dSPOT(θ) of the spot diameter when the ratio df(θ) of the focal length changes cancel out each other.

Specifically, it can be seen that a variation width of the ratio dSPOT(θ) of the spot diameter which is about 19% over the entire region of the angle of view θ due to the change in the ratio dW(θ) of the light flux width, is reduced to almost 0% by changing the ratio df(θ) of the focal length.

That is, the ratio dSPOT(θ) of the spot diameter changes by about 19% over the entire region of the angle of view θ in the conventional light scanning apparatus using the OFS system, while the change in the ratio dSPOT(θ) of the spot diameter can be reduced to almost 0% over the entire region of the angle of view θ in the light scanning apparatus 200 according to the present embodiment.

The light scanning apparatus 200 according to the present embodiment is designed to satisfy the inequalities (21) and (21a) at any angle of view θ from the on-axis image height to the outermost off-axis image height.

Figure 5B:
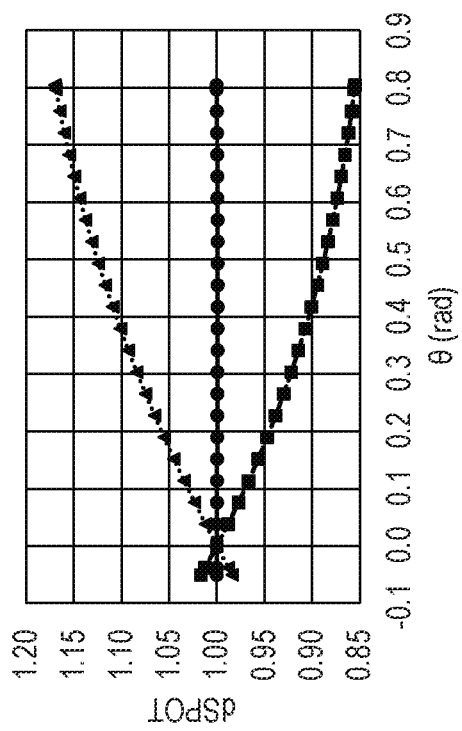
FIG. 5B is a diagram showing a DIST characteristic in the light scanning apparatus according to the second embodiment.

FIG. 5B shows respective DIST characteristics in the conventional light scanning apparatus and the light scanning apparatus 200 according to the present embodiment.

As shown in FIG. 5B, the image height Y changes with respect to the angle of view θ based on a linear function as shown by the expression (12) in the conventional light scanning apparatus, while the image height Y changes with respect to the angle of view θ based on a polynomial function as shown by the expression (15) in the light scanning apparatus 200 according to the present embodiment.

Then, each of DIST coefficients $\alpha_i$ is set such that a difference between the respective DIST characteristics increases, as the angle of view θ increases.

Figure 5C:
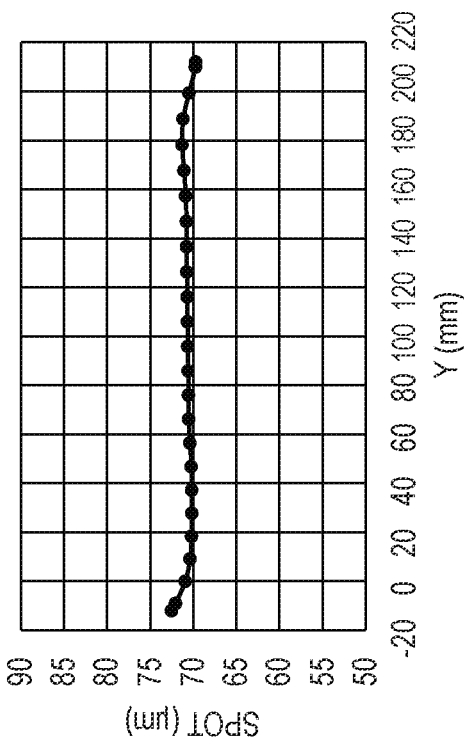
FIG. 5C is a diagram showing a dependence of a spot moving speed with respect to the angle of view in the light scanning apparatus according to the second embodiment.

FIG. 5C shows a dependence of a moving speed $dY/d\theta$ with respect to the angle of view $\theta$ shown by the expression (13) in the conventional light scanning apparatus and a dependence of the moving speed $dY/d\theta$ with respect to the angle of view $\theta$ shown by the expression (16) in the light scanning apparatus 200 according to the present embodiment.

As shown in FIG. 5C, the moving speed $dY/d\theta$ is a constant value of F regardless of the angle of view $\theta$ in the conventional light scanning apparatus, while the moving speed $dY/d\theta$ increases monotonically as the angle of view $\theta$ increases in the light scanning apparatus 200 according to the present embodiment.

Figure 5D:
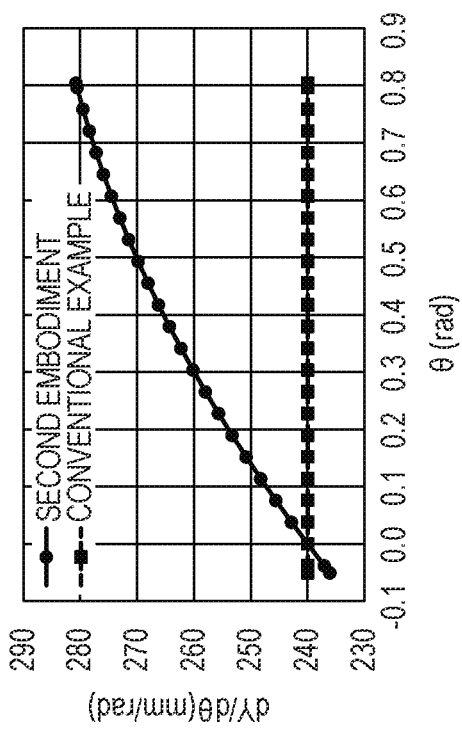
FIG. 5D is a diagram showing a dependence of a spot diameter with respect to an image height in the light scanning apparatus according to the second embodiment.

FIG. 5D shows a magnitude of the spot diameter SPOT in the main scanning direction at each image height on the scanned surface 7 calculated using the specification described in Tables 2-1 to 2-3 in the light scanning apparatus 200 according to the present embodiment.

As shown in FIG. 5D, the spot diameter SPOT has a value between 69.7 micrometers and 72.5 micrometers over an entire image height between the outermost off-axis image height 712 and the outermost off-axis image height 710 in the light scanning apparatus 200 according to the present embodiment.

That is, the spot diameter SPOT has a variation width of about 4.0% over the entire image height.

Here, the reason why the variation width of about 4.0% shown in FIG. 5D is larger than the reduced variation width of almost 0% in the ratio $dSPOT(\theta)$ of the spot diameter shown in FIG. 5A is because a residual aberration, such as a wavefront aberration and a partial magnification, is included in the calculation shown in FIG. 5D.

As described above, it is possible to further suppress the variation of the spot diameter occurring in the OFS system employed for achieving printing with a high-definition at a high-speed without increasing the number of components, and to further reduce the non-uniformity in the image plane illuminance distribution in the light scanning apparatus 200 according to the present embodiment.

Third Embodiment

Figure 6:
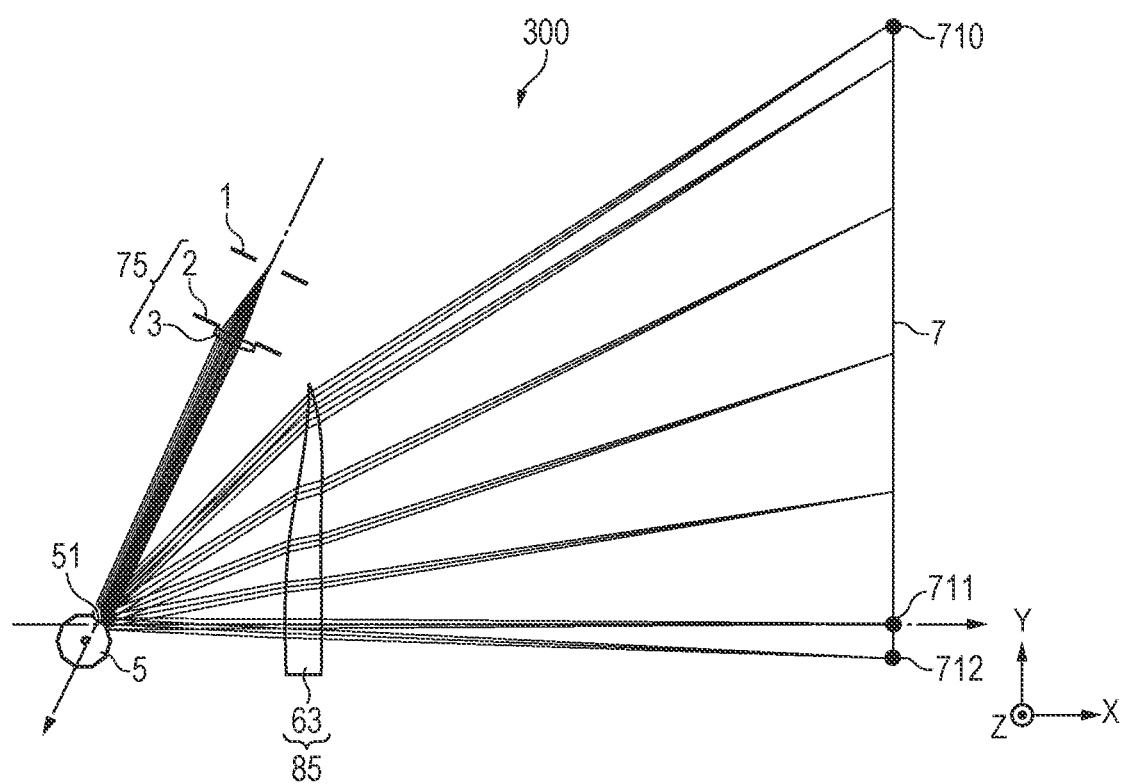
FIG. 6 is a main scanning cross-sectional view of an light scanning apparatus according to a third embodiment of the disclosure.

FIG. 6 shows a main scanning cross-sectional view of a light scanning apparatus 300 according to a third embodiment of the disclosure.

The light scanning apparatus 300 according to the present embodiment has the same structure as the light scanning apparatus 100 according to the first embodiment except that a single imaging lens 63 is used in place of the first imaging lens 61 and the second imaging lens 62, so that the same members are denoted by the same reference numerals and description thereof is omitted.

A specification of the light scanning apparatus 300 according to the present embodiment are described in the following Tables 3-1 to 3-3.

TABLE 3-1

| | |
|---|---|
| Wavelength $\lambda$ (nm) of the light source 1 | 790 |
| Angle $\theta i$ between the optical axis of the incident optical system 75 and that of the imaging optical system 85 (deg) | 63 |
| Circumscribed diameter $\varphi$ of the deflecting unit 5 (mm) | 13.0 |
| Number N of surfaces of the deflecting unit 5 | 10 |
| Width W0 in the main scanning cross section of the deflecting surface 51 (mm) | 4.017 |
| Distance between the center of the deflecting unit 5 and the deflecting surface 51 (mm) | 6.182 |
| X coordinate of the rotation center of the deflecting unit 5 | −5.271 |
| Y coordinate of the rotation center of the deflecting unit 5 | −3.230 |
| F$\theta$ coefficient | 210.0 |
| DIST coefficient $\alpha 2$ | 0.0 |
| DIST coefficient $\alpha 3$ | 22.1 |
| DIST coefficient $\alpha 4$ | 0.0 |
| \|Ymax+\| (mm) | 192 |
| \|Ymax−\| (mm) | 32 |
| Rotation angle of deflecting unit 5 between Y = 0 and Y = Ymax+ (deg) | 24.343 |
| Angle of view $\theta$max+ of a beam traveling to Ymax+ (deg) | 48.686 |
| Rotation angle of deflecting unit 5 between Y = 0 and Y = Ymax− (deg) | −4.356 |
| Angle of view $\theta$max− of a beam traveling to Ymax− (deg) | −8.712 |

TABLE 3-2

| | Surface Number | R | N | X | Y | Z | gx(x) | gx(y) | gx(z) |
|---|---|---|---|---|---|---|---|---|---|
| Light source 1 | 1 | 0.000 | 1.0000 | 63.559 | 124.741 | 0.000 | 0.454 | 0.891 | 0.000 |
| Cover glass | 2 | 0.000 | 1.0000 | 63.445 | 124.518 | 0.000 | 0.454 | 0.891 | 0.000 |
| Stop 2 | 3 | 0.000 | 1.0000 | 51.301 | 100.684 | 0.000 | 0.454 | 0.891 | 0.000 |
| Incident surface of coupling lens 3 | 4 | 0.000 | 2.0000 | 50.847 | 99.793 | 0.000 | 0.454 | 0.891 | 0.000 |
| Exit surface of coupling lens 3 | 5 | aspherical surface | 1.0000 | 49.485 | 97.120 | 0.000 | 0.454 | 0.891 | 0.000 |
| Deflecting surface 51 of deflecting unit 5 | 6 | 0.000 | 1.0000 | 0.000 | 0.000 | 0.000 | 0.853 | 0.523 | 0.000 |
| Incident surface of imaging lens 63 | 7 | aspherical surface | 1.5240 | 56.500 | 0.000 | 0.000 | 1.000 | 0.000 | 0.000 |
| Exit surface of imaging lens 63 | 8 | aspherical surface | 1.0000 | 68.500 | 0.000 | 0.000 | 1.000 | 0.000 | 0.000 |
| Scanned surface 7 | 9 | 0.000 | — | 228.700 | 0.000 | 0.000 | 1.000 | 0.000 | 0.000 |

Size of Stop 2

Main scanning 14.0 mm × sub-scanning 2.62 mm

TABLE 3-3

| | Exit surface of coupling lens 3 (Surface Number 5) |
|---|---|---|---|---|---|---|
| Ru | Ku | B2u | B4u | B6u | B8u | B10u |
| 2.76E+01 | 0.00E+00 | 0.00E+00 | −5.51E−06 | 0.00E+00 | 0.00E+00 | 0.00E+00 |
| Rl | Kl | B2l | B4l | B6l | B8l | B10l |
| 2.76E+01 | 0.00E+00 | 0.00E+00 | −5.51E−06 | 0.00E+00 | 0.00E+00 | 0.00E+00 |
| ru | E2u | E4u | E6u | E8u | E10u | |
| 2.32E+01 | 0.00E+00 | 0.00E+00 | 0.00E+00 | 0.00E+00 | 0.00E+00 | |
| rl | E2l | E4l | E6l | E8l | E10l | |
| 2.32E+01 | 0.00E+00 | 0.00E+00 | 0.00E+00 | 0.00E+00 | 0.00E+00 | |
| | Incident surface of imaging lens 63 (Surface Number 7) |
| Ru | Ku | B2u | B4u | B6u | B8u | B10u |
| 9.40E+01 | −1.01E+01 | 0.00E+00 | −4.00E−07 | 5.29E−11 | −3.48E−15 | 1.39E−19 |
| Rl | Kl | B2l | B4l | B6l | B8l | B10l |
| 9.40E+01 | −1.01E+01 | 0.00E+00 | −4.00E−07 | 5.29E−11 | −3.48E−15 | 1.39E−19 |
| ru | E2u | E4u | E6u | E8u | E10u | |
| −1.27E+01 | 3.73E−05 | −6.33E−09 | 3.63E−13 | −3.06E−17 | 7.80E−21 | |
| rl | E2l | E4l | E6l | E8l | E10l | |
| −1.27E+01 | 3.73E−05 | −6.33E−09 | 3.63E−13 | −3.06E−17 | 7.80E−21 | |
| | Exit surface of imaging lens 63 (Surface Number 8) |
| Ru | Ku | B2u | B4u | B6u | B8u | B10u |
| 1.38E+02 | −2.11E+01 | 0.00E+00 | −4.93E−07 | 4.95E−11 | −3.52E−15 | 2.04E−19 |
| Rl | Kl | B2l | B4l | B6l | B8l | B10l |
| 1.38E+02 | −2.11E+01 | 0.00E+00 | −4.93E−07 | 4.95E−11 | −3.52E−15 | 2.04E−19 |
| ru | E2u | E4u | E6u | E8u | E10u | |
| −1.13E+01 | 2.20E−05 | −5.37E−09 | 1.86E−12 | −4.27E−16 | 3.70E−20 | |
| rl | E2l | E4l | E6l | E8l | E10l | |
| −1.13E+01 | 2.20E−05 | −5.37E−09 | 1.86E−12 | −4.27E−16 | 3.70E−20 | |

Here, a definition of the local coordinate system for each optical surface and a definition of the surface shape of each optical surface are the same as those in the light scanning apparatus 100 according to the first embodiment.

Figure 7A:
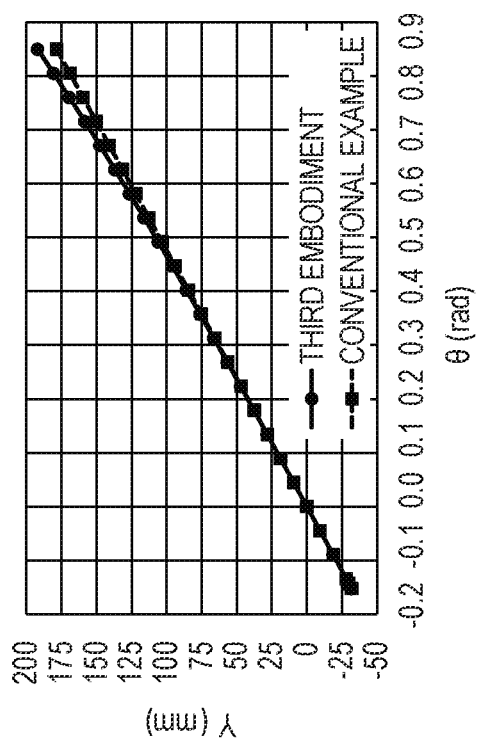
FIG. 7A is a diagram showing a dependence of a spot diameter ratio with respect to an angle of view in the light scanning apparatus according to the third embodiment.

FIG. 7A shows a dependence of the ratio dSPOT of the spot diameter in the main scanning direction with respect to the angle of view θ in the light scanning apparatus 300 according to the present embodiment.

Specifically, a dependence of the ratio dSPOT of the spot diameter with respect to the angle of view θ when the ratio dW(θ) of the light flux width changes based on the expression (14) is shown by a broken line in FIG. 7A.

As shown in FIG. 7A, a variation width of dSPOT is about 23% over an entire region of the angle of view θ, and it is understood that a variation of the light flux width W is a contributing factor of a variation of the spot diameter SPOT in the main scanning direction.

In the light scanning apparatus 300 according to the present embodiment, similarly to the light scanning apparatus 100 according to the first embodiment, a power in the main scanning cross section of the imaging optical system 85 is set so as to decrease, namely a focal length f(θ) in the main scanning cross section of the imaging optical system 85 is set so as to increase, as the angle of view θ increases from the on-axis image height 711 to the outermost off-axis image height 710.

A dependence of the ratio dSPOT of the spot diameter with respect to the angle of view θ when the light flux width does not change at each angle of view, namely dW(θ) is set to 1 based on the expression (20) is shown by the dotted line in FIG. 7A.

A dependence of dSPOT with respect to the angle of view θ when both of dW(θ) and df(θ) change based on the expression (20) is shown by the solid line in FIG. 7A.

As shown in FIG. 7A, it can be seen that the ratio dSPOT(θ) of the spot diameter when the ratio dW(θ) of the light flux width changes and the ratio dSPOT(θ) of the spot diameter when the ratio df(θ) of the focal length changes cancel out each other.

Specifically, it can be seen that a variation width of the ratio dSPOT(θ) of the spot diameter, which is about 23% over the entire region of the angle of view θ due to the change in the ratio dW(θ) of the light flux width, is reduced to about 11% by changing the ratio df(θ) of the focal length.

That is, the ratio dSPOT(θ) of the spot diameter changes by about 23% over the entire region of the angle of view θ in the conventional light scanning apparatus using the OFS system, while the change in the ratio dSPOT(θ) of the spot diameter can be reduced to about 11% over the entire region of the angle of view θ in the light scanning apparatus 300 according to the present embodiment.

The light scanning apparatus 300 according to the present embodiment is designed to satisfy the inequalities (21) and (21a) at any angle of view θ between the on-axis image height and the outermost off-axis image height.

Figure 7B:
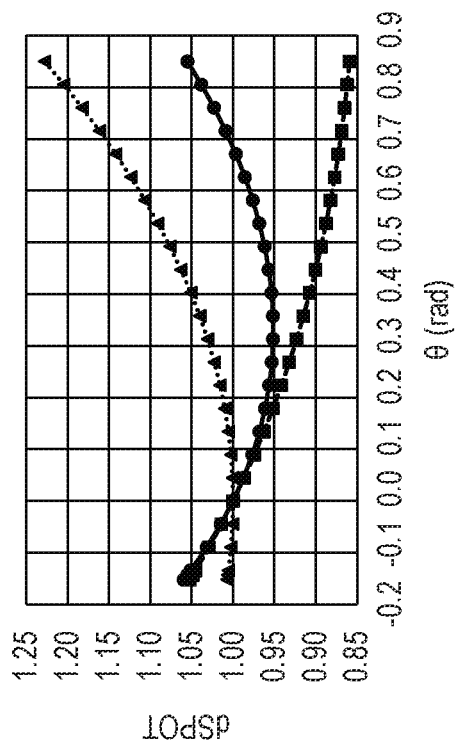
FIG. 7B is a diagram showing a DIST characteristic in the light scanning apparatus according to the third embodiment.

FIG. 7B shows respective DIST characteristics in the conventional light scanning apparatus and the light scanning apparatus 300 according to the present embodiment.

As shown in FIG. 7B, the image height Y changes with respect to the angle of view θ based on a linear function as shown by the expression (12) in the conventional light scanning apparatus, while the image height Y changes with respect to the angle of view θ based on a polynomial function as shown by the expression (15) in the light scanning apparatus 300 according to the present embodiment.

Then, each of the DIST coefficients $\alpha_i$ is set such that a difference between the respective DIST characteristics increases, as the angle of view θ increases.

Figure 7C:
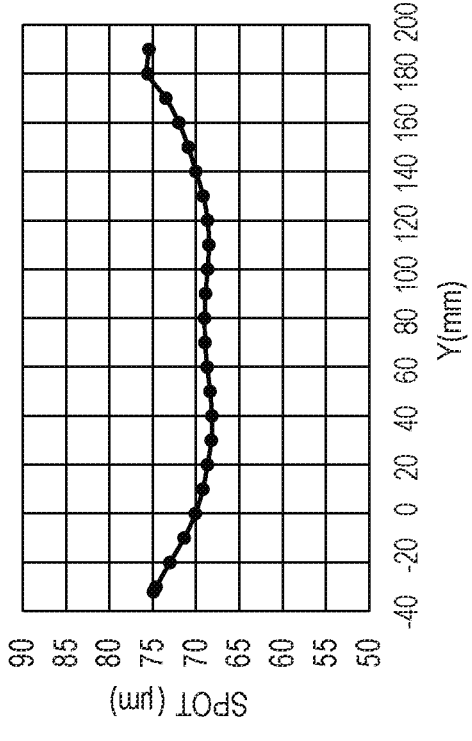
FIG. 7C is a diagram showing a dependence of a spot moving speed with respect to the angle of view in the light scanning apparatus according to the third embodiment.

FIG. 7C shows a dependence of the moving speed dY/dθ with respect to the angle of view θ shown by the expression (13) in the conventional light scanning apparatus and a dependence of the moving speed dY/dθ with respect to the angle of view θ shown by the expression (16) in the light scanning apparatus 300 according to the present embodiment.

As shown in FIG. 7C, the moving speed dY/dθ is a constant value of F regardless of the angle of view θ in the conventional light scanning apparatus, while the moving speed dY/dθ increases monotonically as the angle of view θ increases in the light scanning apparatus 300 according to the present embodiment.

Figure 7D:
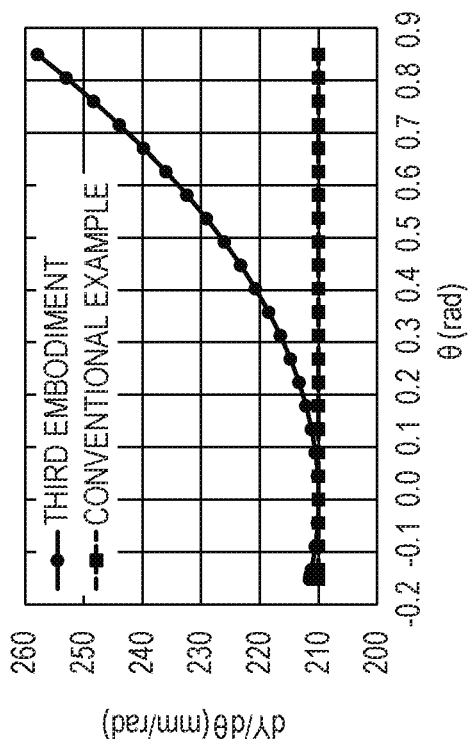
FIG. 7D is a diagram showing a dependence of a spot diameter with respect to an image height in the light scanning apparatus according to the third embodiment.

FIG. 7D shows a magnitude of the spot diameter SPOT in the main scanning direction at each image height on the scanned surface 7 calculated using a specification described in Tables 3-1 to 3-3 in the light scanning apparatus 300 according to the present embodiment.

As shown in FIG. 7D, the spot diameter SPOT has a value between 68.2 micrometers and 76.4 micrometers over an entire image height between the outermost off-axis image height 712 and the outermost off-axis image height 710 in the light scanning apparatus 300 according to the present embodiment.

That is, the spot diameter SPOT has a variation width of about 12.0% over the entire image height.

The reason why the variation width of about 12.0% shown in FIG. 7D is larger than the reduced variation width of about 11% in the ratio dSPOT(θ) of the spot diameter shown in FIG. 7A is because a residual aberration, such as a wavefront aberration and a partial magnification, is included in the calculation shown in FIG. 7D.

As described above, it is possible to suppress the variation of the spot diameter occurring in the OFS system employed for achieving printing with a high-definition at a high-speed without increasing the number of components, and to reduce the non-uniformity in the image plane illuminance distribution in the light scanning apparatus 300 according to the present embodiment.

According to the aspect of the embodiments, it is possible to provide a compact light scanning apparatus that can suppress variations in the spot diameter and the illuminance associated with the OFS system.

[Image Forming Apparatus]

Figure 8:
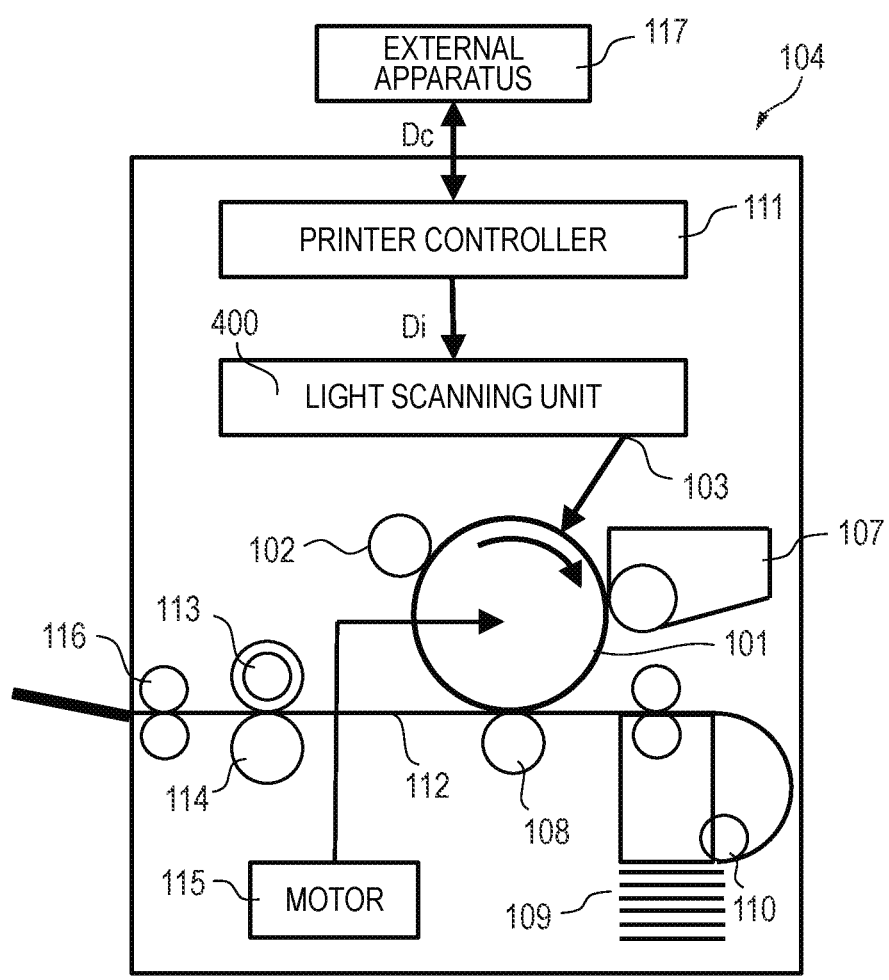
FIG. 8 is a sub-scanning cross-sectional view of a main portion of an image forming apparatus according to an embodiment of the disclosure.
Figure 9:
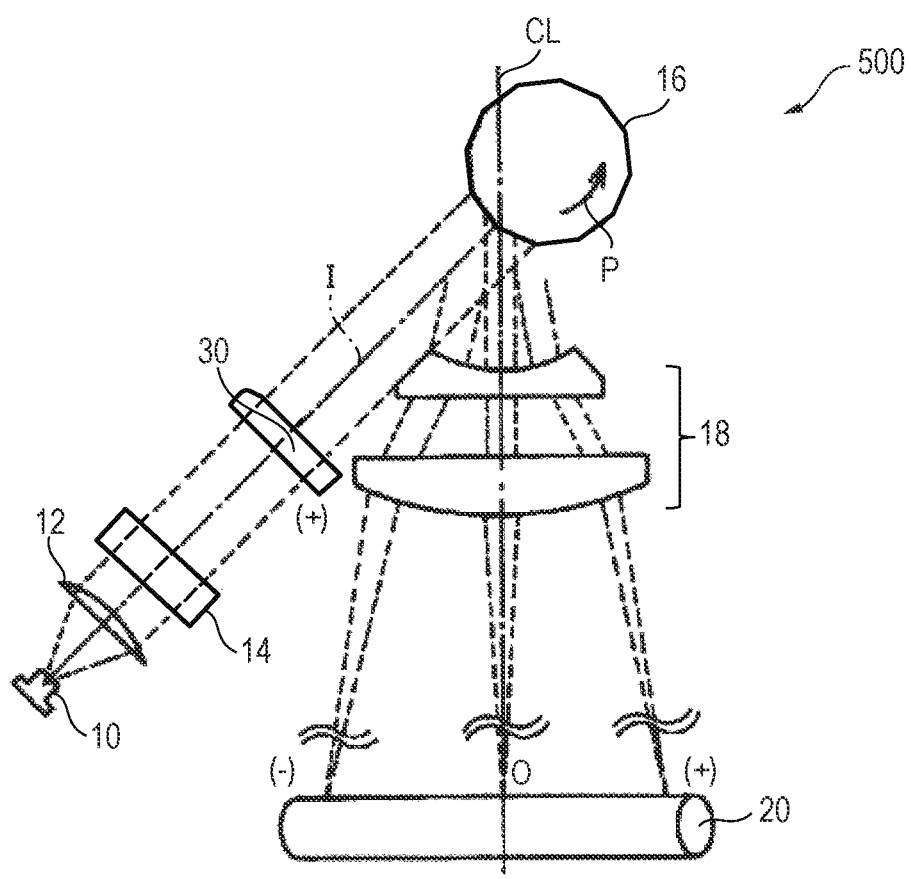
FIG. 9 is a main scanning cross-sectional view of a light scanning apparatus disclosed in Japanese Patent Application Laid-Open No. H11-202242.

FIG. 8 shows a sub-scanning cross-sectional view of a main portion of an image forming apparatus (electrophotographic printer) 104 including the light scanning apparatus according to any one of the first to third embodiments of the disclosure.

As shown in FIG. 8, code data Dc is input to the image forming apparatus 104 from an external apparatus 117 such as a personal computer.

Then, the input code data Dc is converted into image data (dot data) Di by the printer controller 111 in the apparatus.

The converted image data Di is inputted to an light scanning unit 400 which is the light scanning apparatus according to any one of the first to third embodiments of the disclosure.

Then, a light beam (light flux) 103 modulated in accordance with the image data Di is emitted from the light scanning unit 400, and a photosensitive surface of a photosensitive drum 101 is scanned in the main scanning direction by the light beam 103.

The photosensitive drum 101 serving as an electrostatic latent image carrier (photosensitive body) is rotated clockwise by a motor 115.

Then, the photosensitive surface of the photosensitive drum 101 moves in the sub-scanning direction perpendicular to the main scanning direction with respect to the light flux 103 accompanied by this rotation.

A charging roller 102 for uniformly charging a surface of the photosensitive drum 101 is provided above the photosensitive drum 101 so as to abut on the surface.

Then, the surface of the photosensitive drum 101 charged by the charging roller 102 is irradiated with the light beam 103 scanned by the light scanning unit 400.

As described above, the light beam 103 is modulated based on the image data Di, and an electrostatic latent image is formed on the surface of the photosensitive drum 101 by irradiating the light beam 103.

Then, the formed electrostatic latent image is developed as a toner image by a developing unit 107 arranged so as to abut on the photosensitive drum 101 at a downstream side in a rotational cross section of the photosensitive drum 101 from an irradiated position of the light beam 103.

The toner image developed by the developing unit 107 is transferred onto a sheet 112 as a transferred material by a transferring roller (transferring unit) 108 arranged below the photosensitive drum 101 so as to face the photosensitive drum 101.

Although the sheet 112 is stored in the sheet cassette 109 arranged in front of the photosensitive drum 101 (right side in FIG. 8), the sheet can also be fed manually.

The sheet 112 in the sheet cassette 109 is fed to a conveying path by a sheet feeding roller 110 arranged at an end of the sheet cassette 109.

The sheet 112 on which the unfixed toner image has been transferred as described above is further conveyed to a fixing unit arranged behind the photosensitive drum 101 (left side in FIG. 8).

The fixing unit consists of a fixing roller 113 having a fixing heater (not shown) therein, and a pressurizing roller 114 arranged so as to press against the fixing roller 113.

Then, the sheet 112 conveyed from the transferring roller 108 is heated with being pressurized by a pressure contact portion between the fixing roller 113 and the pressurizing roller 114, thereby the unfixed toner image on the sheet 112 is fixed.

A sheet discharging roller 116 is arranged behind the fixing unit, and the fixed sheet 112 is discharged to an outside of the image forming apparatus 104.

Although not shown in FIG. 8, the printer controller 111 controls each member, such as the motor 115, in the image forming apparatus 104, and controls a member, such as a polygon motor, in the light scanning unit 400 in addition to the data conversion described above.

Further, although the light scanning apparatus according to any one of the first to third embodiments is applied to the image forming apparatus 104 of a type for printing in monotone here, it is needless to say that it can also be applied to a color image forming apparatus for scanning and drawing a plurality of photosensitive bodies with a plurality of light beams.

In this case, four light scanning apparatus according to any one of the first to third embodiments may be provided in parallel in a color image forming apparatus in which images of four colors are superimposed, for example.

Although the embodiments have been described above, the disclosure is not limited to these embodiments, and various modifications and changes can be made within a scope of a gist thereof.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-163480, filed Sep. 29, 2020, which is hereby incorporated by reference herein in its entirety.

What is claimed is:

1. An apparatus comprising:
a deflecting unit configured to deflect a light flux from a light source to scan a scanned surface in a main scanning direction; and
an imaging optical system configured to guide the deflected light flux to the scanned surface,
wherein a width of the light flux is larger than the width of a deflecting surface of the deflecting unit in a main scanning cross section when the light flux is incident on the deflecting surface,
wherein a refractive power in the main scanning cross section of the imaging optical system is different between a first position through which an on-axis light flux passes and a second position through which an outermost off-axis light flux passes, and
wherein a first region at one side is longer than a second region at the other side with respect to an optical axis of the imaging optical system on the scanned surface.

2. The apparatus according to claim 1, wherein the refractive power changes monotonically between the first position and the second position.

3. The apparatus according to claim 2, wherein the refractive power at the second position is smaller than the refractive power at the first position.

4. The apparatus according to claim 1, wherein a scanning speed of the light flux on the scanned surface is different between an on-axis image height and an outermost off-axis image height.

5. The apparatus according to claim 4, wherein the scanning speed changes monotonically between the on-axis image height and the outermost off-axis image height.

6. The apparatus according to claim 5, wherein the scanning speed at the outermost off-axis image height is larger than the scanning speed at the on-axis image height.

7. The light scanning apparatus according to claim 1, wherein a traveling direction of the light flux when the light flux is incident on the deflecting surface is not parallel to an optical axis of the imaging optical system in the main scanning cross section.

8. The apparatus according to claim 1, wherein the following inequality is satisfied:

$$|Y_{max+}| > |Y_{max-}|$$

where $Y_{max+}$ and $Y_{max-}$ represent a coordinate in the main scanning direction of the outermost off-axis image height at the one side and at the other side, respectively, when the coordinate in the main scanning direction of the on-axis image height is represented by 0.

9. The apparatus according to claim 1, further comprising an incident optical system configured to make the light flux from the light source be incident on the deflecting surface of the deflecting unit,
wherein the incident optical system is arranged at the one side.

10. The apparatus according to claim 9, wherein the following inequality is satisfied:

$$\theta_i - \theta_{max-} < 4\pi/N$$

where $\theta_{max-}$ represents an angle formed by a traveling direction of the outermost off-axis light flux toward the outermost off-axis image height at the other side when the outermost off-axis light flux is deflected by the deflecting surface with respect to the optical axis of the imaging optical system in the main scanning cross section, $\theta_i$ represents an angle formed by the optical axis of the incident optical system with respect to the optical axis of the imaging optical system in the main scanning cross section, and N represents the number of the deflecting surfaces of the deflecting unit.

11. The apparatus according to claim 9, wherein each of the optical axes of the incident optical system and the imaging optical system is parallel to the main scanning cross section.

12. The apparatus according to claim 1, wherein the following inequality is satisfied:

$$0.90 < df(\theta)/dW(\theta) < 1.10$$

where $\theta$ represents an angle formed by a traveling direction of the light flux when the light flux is deflected by the deflecting surface with respect to the optical axis of the imaging optical system in the main scanning cross section, $dW(\theta)$ represents a ratio of a width of an off-axis light flux deflected at the angle of $\theta$ when the off-axis light flux is incident on the imaging optical system to the width of the on-axis light flux when the on-axis light flux is incident on the imaging optical system, and $df(\theta)$ represents a ratio of a focal length at a position through which the off-axis light flux passes to the focal length at the first position in the imaging optical system.

13. The apparatus according to claim 1, wherein the first region is a region at a side where the light source is arranged with respect to the optical axis.

14. The apparatus according to claim 1, wherein a region through which light fluxes traveling toward the first region pass is longer than a region through which light fluxes traveling toward the second region pass on an optical element included in the imaging optical system.

15. An image forming apparatus comprising:
the apparatus of claim 1;
a developing unit configured to develop, as a toner image, an electrostatic latent image formed on the scanned surface by the apparatus;
a transferring unit configured to transfer the developed toner image onto a transferred material; and
a fixing unit configured to fix the transferred toner image on the transferred material.

16. The image forming apparatus according to claim 15, wherein the following inequality is satisfied:

$$|Y_{max+}| > |Y_{max-}|$$

where $Y_{max+}$ and $Y_{max-}$ represent a coordinate in the main scanning direction of the outermost off-axis image height at the one side and at the other side, respectively, when the coordinate in the main scanning direction of the on-axis image height is represented by 0.

17. The image forming apparatus according to claim 15, wherein the following inequality is satisfied:

$$0.90 < df(\theta)/dW(\theta) < 1.10$$

where θ represents an angle formed by a traveling direction of the light flux when the light flux is deflected by the deflecting surface with respect to the optical axis of the imaging optical system in the main scanning cross section, dW(θ) represents a ratio of a width of an off-axis light flux deflected at the angle of θ when the off-axis light flux is incident on the imaging optical system to the width of the on-axis light flux when the on-axis light flux is incident on the imaging optical system, and df(θ) represents a ratio of a focal length at a position through which the off-axis light flux passes to the focal length at the first position in the imaging optical system.

18. An image forming apparatus comprising:
the apparatus of claim 1; and
a controller configured to convert a signal output from an external apparatus into image data to input the image data to the apparatus.

19. The image forming apparatus according to claim 18, wherein the following inequality is satisfied:

$$|Y_{max+}| > |Y_{max-}|$$

where $Y_{max+}$ and $Y_{max-}$ represent a coordinate in the main scanning direction of the outermost off-axis image height at the one side and at the other side, respectively, when the coordinate in the main scanning direction of the on-axis image height is represented by 0.

20. The image forming apparatus according to claim 18, wherein the following inequality is satisfied:

$$0.90 < df(\theta)/dW(\theta) < 1.10$$

where θ represents an angle formed by a traveling direction of the light flux when the light flux is deflected by the deflecting surface with respect to the optical axis of the imaging optical system in the main scanning cross section, dW(θ) represents a ratio of a width of an off-axis light flux deflected at the angle of θ when the off-axis light flux is incident on the imaging optical system to the width of the on-axis light flux when the on-axis light flux is incident on the imaging optical system, and df(θ) represents a ratio of a focal length at a position through which the off-axis light flux passes to the focal length at the first position in the imaging optical system.

* * * * *